US012771487B2

(12) United States Patent
Takahashi et al.

(10) Patent No.: US 12,771,487 B2
(45) Date of Patent: Oct. 20, 2026

(54) TERMINAL AND WIRELESS COMMUNICATION METHOD

(71) Applicant: NTT DOCOMO, INC., Tokyo (JP)

(72) Inventors: Yuki Takahashi, Tokyo (JP); Satoshi Nagata, Tokyo (JP); Qiping Pi, Beijing (CN); Jing Wang, Beijing (CN); Lan Chen, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 283 days.

(21) Appl. No.: 18/293,143

(22) PCT Filed: Aug. 5, 2021

(86) PCT No.: PCT/JP2021/029225
§ 371 (c)(1),
(2) Date: Jan. 29, 2024

(87) PCT Pub. No.: WO2023/013005
PCT Pub. Date: Feb. 9, 2023

(65) Prior Publication Data

US 2024/0284433 A1 Aug. 22, 2024

(51) Int. Cl.

| | |
|---|---|
| *H04L 1/1829* | (2023.01) |
| *H04L 1/1812* | (2023.01) |
| *H04W 72/0446* | (2023.01) |
| *H04W 72/11* | (2023.01) |
| *H04W 72/1273* | (2023.01) |

(52) U.S. Cl.
CPC .......... *H04L 1/1854* (2013.01); *H04L 1/1812* (2013.01); *H04L 1/1861* (2013.01); *H04W 72/0446* (2013.01); *H04W 72/11* (2023.01); *H04W 72/1273* (2013.01)

(58) Field of Classification Search
CPC ... H04L 1/1854; H04L 1/1812; H04L 1/1861; H04L 5/0053; H04L 5/0005; H04W 72/0446; H04W 72/11; H04W 72/1273
See application file for complete search history.

(56) References Cited

U.S. PATENT DOCUMENTS

| | | | | |
|---|---|---|---|---|
| 2022/0045801 A1* | 2/2022 | Wang | H04W 72/56 |
| 2022/0201728 A1* | 6/2022 | Lin | H04L 1/1614 |
| 2022/0303065 A1* | 9/2022 | Hosseinian | H04L 1/1854 |
| 2023/0094711 A1* | 3/2023 | Wu | H04L 1/1887 370/329 |

(Continued)

OTHER PUBLICATIONS

Notice of Reasons for Refusal issued in Japanese Application No. 2023-539518, mailed May 7, 2025 (6 pages).

(Continued)

*Primary Examiner* — Redentor Pasia
(74) *Attorney, Agent, or Firm* — Osha Bergman Watanabe & Burton LLP

(57) ABSTRACT

This terminal includes: a control unit that multiplexes a first code book for a response signal of a signal that is included in a first slot and is dynamically scheduled, and a second code book for a response signal of a signal that is included in a second slot and that is semi-dynamically scheduled, the second slot being an uplink cell slot different from the first slot and overlapping with the first slot; and a transmission unit that transmits the first code book and the second code book that have been multiplexed.

4 Claims, 17 Drawing Sheets

(56) References Cited

U.S. PATENT DOCUMENTS

| | | | | |
|---|---|---|---|---|
| 2023/0239077 | A1* | 7/2023 | Gerami | H04W 72/1273 370/329 |
| 2023/0291508 | A1* | 9/2023 | Blankenship | H04L 1/1854 |
| 2023/0299891 | A1* | 9/2023 | Kittichokechai | H04L 1/1896 370/336 |
| 2023/0388062 | A1* | 11/2023 | Kim | H04L 5/0055 |
| 2024/0007228 | A1* | 1/2024 | Wu | H04L 1/1812 |
| 2024/0381359 | A1* | 11/2024 | Chien | H04L 1/1854 |

OTHER PUBLICATIONS

3GPP TSG RAN Meeting #88e; RP-201310 "Revised WID: Enhanced Industrial Internet of Things (IOT) and ultra-reliable and low latency communication (URLLC) support for NR" Nokia, Nokia Shanghai Bell; Electronic meeting, Jun. 29-Jul. 3, 2020 (6 pages).
3GPP TSG RAN WG1 #105-e; R1-2104512 "UE feedback enhancements for HARQ-ACK" CATT; e-Meeting, May 19-27, 2021 (5 pages).
3GPP TSG RAN WG1 #104b-e; R1-2103527 "UE feedback enhancements for HARQ-ACK" NEC; e-Meeting, Apr. 12-20, 2021 (14 pages).
International Search Report issued in International Application No. PCT/JP2021/029225, mailed Feb. 22, 2022 (3 pages).
Written Opinion issued in International Application No. PCT/JP2021/029225; Dated Feb. 22, 2022 (3 pages).

* cited by examiner

TERMINAL AND WIRELESS COMMUNICATION METHOD

TECHNICAL FIELD

The present disclosure relates to a terminal and a radio communication method.

BACKGROUND ART

Long Term Evolution (LTE) has been specified for achieving a higher data rate, lower latency, and the like in a Universal Mobile Telecommunication System (UMTS) network. Future systems of LTE have also been studied for achieving a broader bandwidth and a higher speed based on LTE. Examples of the future systems of LTE include systems called LTE-Advanced (LTE-A), Future Radio Access (FRA), 5th generation mobile communication system (5G), 5G plus (5G+), Radio Access Technology (New-RAT), New Radio (NR), and the like.

In NR, for example, enhancement of a feedback function from a terminal to a base station has been discussed in order to improve the communication quality (e.g., see Non-Patent Literature (hereinafter, referred to as "NPL") 1).

Information to be fed back from the terminal to the base station is transmitted in a resource of a Physical Uplink Control Channel (PUCCH). Supporting PUCCH carrier switching has been agreed with respect to the extension of an Ultra-Reliable and Low Latency Communications (URLLC) technology in Release 17 of 3GPP.

CITATION LIST

Non-Patent Literature

NPL 1
"Enhanced Industrial Internet of Things (IoT) and ultra-reliable and low latency communication," RP-201310, 3GPP TSG RAN Meeting #86e, 3GPP, July 2020

SUMMARY OF INVENTION

Technical Problem

There is scope for further study on generation of a codebook of a case where a slot including a codebook for a response signal in a dynamically-scheduled signal and a slot including a codebook for a response signal in a semi-statically-scheduled signal overlap with each other in different cells.

An aspect of the present disclosure is to provide a terminal and a radio communication method each capable of generating a codebook of a case where a slot including a codebook for a response signal in a dynamically-scheduled signal and a slot including a codebook for a response signal in a semi-statically-scheduled signal overlap with each other in different cells.

A terminal according to an aspect of the present disclosure includes: a control section that multiplexes, with each other, a first codebook included in a first slot and a second codebook included in a second slot, the first codebook being for a response signal in a dynamically-scheduled signal, the second codebook being for a response signal in a semi-persistently-scheduled signal, the second slot being a slot that is on an uplink cell different from that of the first slot and that overlaps with the first slot; and a transmission section that transmits the multiplexed first codebook and the second codebook.

A communication method according to an aspect of the present disclosure includes: multiplexing, with each other, a first codebook included in a first slot and a second codebook included in a second slot, the first codebook being for a response signal in a dynamically-scheduled signal, the second codebook being for a response signal in a semi-persistently-scheduled signal, the second slot being a slot that is on an uplink cell different from that of the first slot and that overlaps with the first slot; and transmitting the multiplexed first codebook and the second codebook.

DESCRIPTION OF EMBODIMENTS

Hereinafter, an embodiment according to an aspect of the present disclosure will be described in detail with reference to the accompanying drawings. 3GPP has been discussing technologies for schemes called URLLC and Industrial Internet of Things (IIoT) in Rel. 17.

In URLLC, enhancement of a feedback function of a terminal for a Hybrid Automatic Repeat request-Acknowledgement (HARQ-ACK) has been studied. The HARQ-ACK is an example of information on a confirmation response (e.g., acknowledgement) to data received by the terminal. With respect to these study matters for URLLC, supporting dynamic and semi-static PUCCH carrier switching has been agreed. Note that, the PUCCH carrier switching may be called by other names such as control-information-transmitting carrier switching.

The PUCCH carrier switching is a technology to be applied to a case where a base station performs communication through a plurality of cells. Hereinafter, dual connectivity, which is an example of the communication through a plurality of cells, and the PUCCH carrier switching will be described.

<Dual Connectivity>

Figure 1:
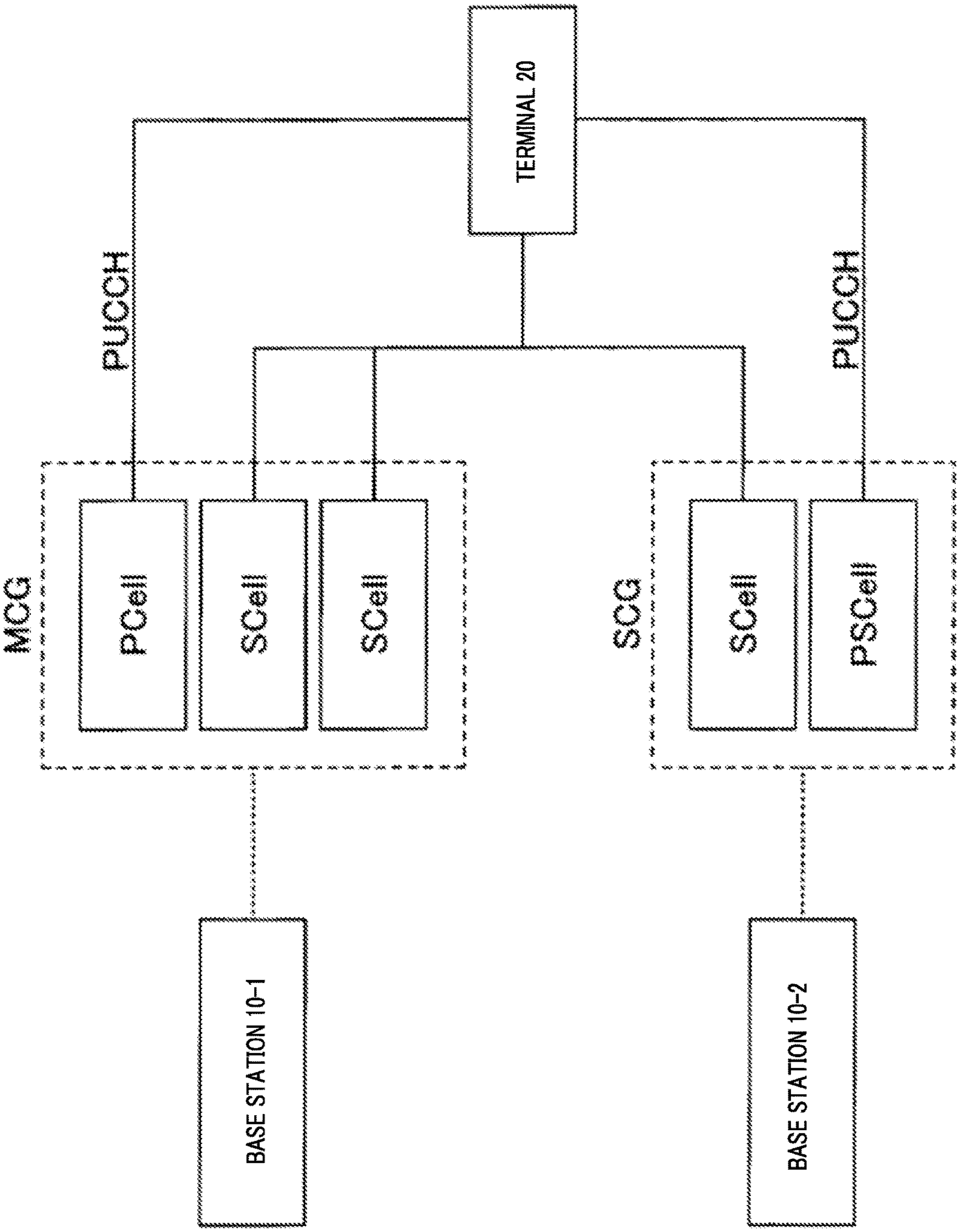
FIG. 1 illustrates an example of dual connectivity.

FIG. 1 illustrates an example of dual connectivity (DC). In the example of FIG. 1, base station 10-1 may be a Master Node (MN), and base station 10-2 may be a Secondary Node (SN). As illustrated in the example of FIG. 1, carriers between different base stations are aggregated in the DC.

In the example of FIG. 1, base station 10-1 communicates with terminal 20 through a primary cell (Pcell) and secondary cells (Scells). In the example of FIG. 1, terminal 20 has established an RRC connection with base station 10-1.

In the case of DC, a latency in communication between base stations 10-1 and 10-2 may be present, so that it is difficult to indicate, to base station 10-2, uplink control information (e.g., Uplink Control Information (UCI)) received in the Pcell of base station 10-1 via a backhaul link (e.g., a wired or wireless link connecting between base stations 10-1 and 10-2) to reflect the uplink control information in scheduling of an Scell under base station 10-2. Accordingly, in the DC, in addition to the Pcell of base station 10-1, one carrier under base station 10-2 may be configured as a Primary Scell (PScell), and PUCCH transmission may be supported by the PScell. In this case, terminal 20 transmits the UCI to base station 10-2 through the PScell.

In the example of FIG. 1, terminal 20 configures, in addition to the Pcell, the Scells for base station 10-1. Further, terminal 20 configures, in addition to the PScell, the Scell for base station 10-2. Terminal 20 transmits the UCI of each carrier under base station 10-1 via PUCCH of the Pcell. Further, terminal 20 transmits the UCI of each carrier under base station 10-2 via PUCCH of the PScell. In the example of FIG. 1, a cell group (CG) under base station 10-1 may be referred to as a Master Cell-Group (MCG), and a cell group under base station 10-2 may be referred to as a Secondary Cell-Group (SCG).

In a case where the DC is performed, terminal 20 may transmit PUCCH through a Pcell, a PScell, and/or a PUCCH-Scell. Generally, it is not assumed that terminal 20 transmits PUCCH through an Scell other than the Pcell, the PScell, and the PUCCH-Scell.

<PUCCH Carrier Switching>

The PUCCH carrier switching has been studied as a method of reducing latency in HARQ-ACK feedback in a Time Division Duplex (TDD) scheme.

Figure 2:
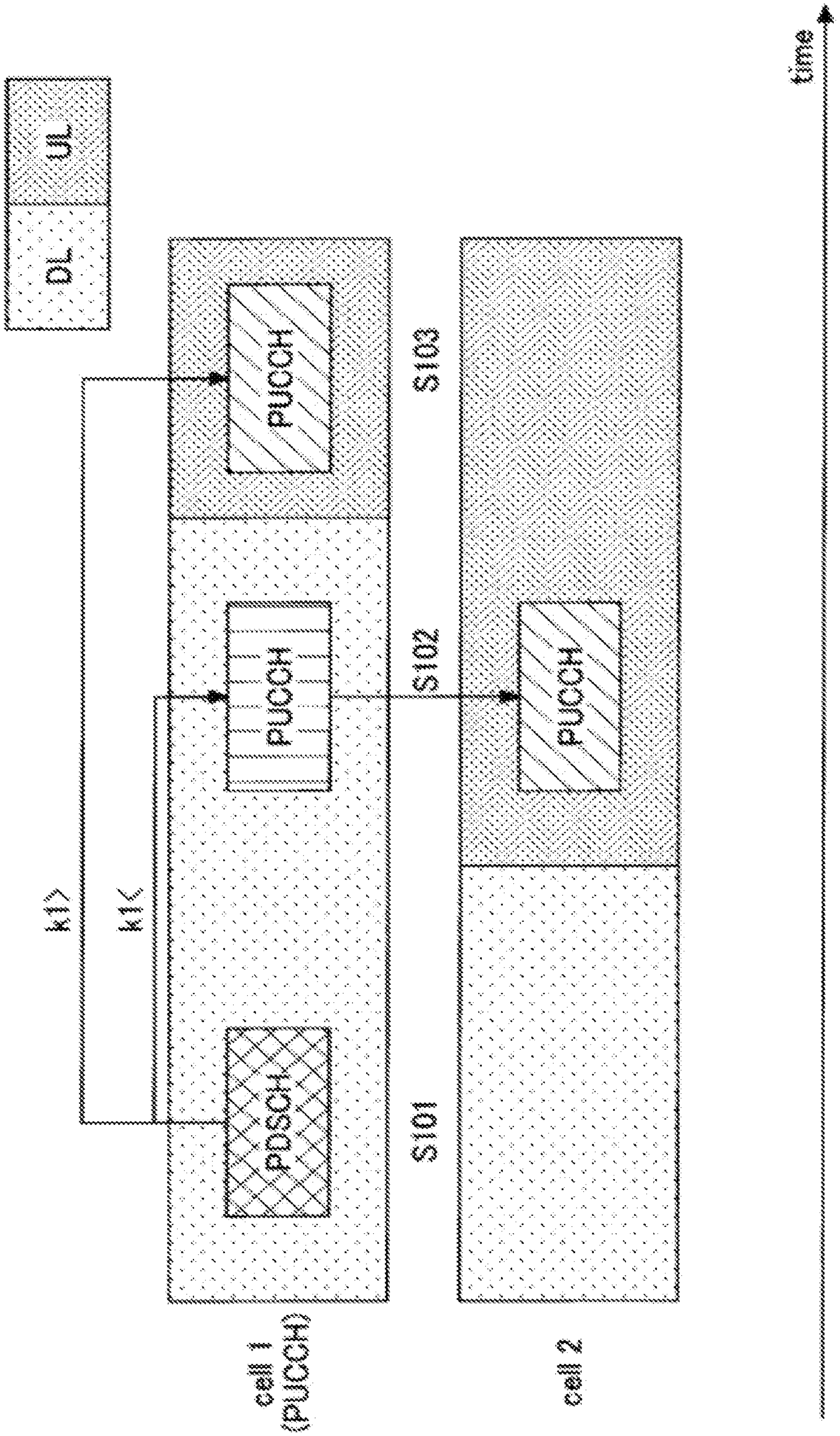
FIG. 2 illustrates an example of PUCCH carrier switching.

FIG. 2 illustrates an example of the PUCCH carrier switching. In the example of FIG. 2, a base station and a terminal communicate with each other through cells 1 and 2. In the example of FIG. 2, cell 1 is a Pcell whereas cell 2 is an Scell. Further, the example of FIG. 2 illustrates downlink (DL) slots and uplink (UL) slots in the cells.

In the example of FIG. 2, the terminal receives data (receives Physical Downlink shared Channel (PDSCH)) at the timing of S101. The terminal attempts to transmit HARQ-ACK for the data received in S101 at the timing of S102, but the slot of cell 1 at the timing of S102 is the downlink (DL) slot. For this reason, in a case where the terminal transmits HARQ-ACK in cell 1, transmission of the HARQ-ACK is held until a transmission timing of PUCCH in the uplink (UL) slot (e.g., timing of S103 of FIG. 2), so that latency in the HARQ-ACK transmission increases. Note that, the PUCCH transmission timing in the uplink (UL) slot may be referred to as a PUCCH transmission occasion.

In the example of FIG. 2, the slot of cell 2 at the timing of S102 is the UL slot. In the example of FIG. 2, the latency in the HARQ-ACK transmission can be reduced when the terminal can transmit the HARQ-ACK for the data received in S101 on the PUCCH transmission occasion at the timing of S102 in cell 2. In URLLC, low latency in a radio section is especially required. Accordingly, in 3GPP, the PUCCH carrier switching in which the terminal switches between carriers for performing PUCCH transmission has been studied as an extension of the URLLC technology.

Note that, in the following embodiment, "the same timing" may be completely the same timing or may represent that all or some of time resources (e.g., one or a plurality of symbols (which may also be resource(s) in time units shorter than symbols)) are the same or overlap.

The PUCCH carrier switching may represent that in a case where the terminal attempts to perform PUCCH transmission at a specific transmission timing of a Pcell (which may be PScell or PUCCH-Scell), the terminal switches a cell in which the PUCCH transmission is performed from the Pcell (which may be PScell or PUCCH-Scell) to an Scell (which is Scell other than PScell in the case of PScell and is Scell other than PUCCH-Scell in the case of PUCCH-Scell) of one or a plurality of Scells in which a slot at the same timing as the specific transmission timing is a UL slot, since the slot at the specific transmission timing of the Pcell (which may be PScell or PUCCH-Scell) is a DL slot. Note that, in an embodiment of the present invention, the unit of the specific transmission timing is not limited to the slot. For example, the specific transmission timing may be a timing in units of subframes or may be a timing in units of symbols.

Two methods have been studied for achieving the PUCCH carrier switching. The first method is a method in which a base station dynamically indicates, to a terminal, a carrier for performing PUCCH transmission. The second method is a method in which a base station semi-statically configures, for a terminal, a carrier for performing the PUCCH transmission. Note that, in the embodiment described below, "PUCCH transmission" and "transmitting PUCCH" may refer to transmission of uplink control information via PUCCH.

The terminal may indicate, to the base station, terminal capability information (UE capability) that specifies information on capability of the terminal for the PUCCH transmission.

For example, information indicating whether the terminal supports switching between configurations related to transmission of control information may be specified as the UE capability information of the terminal. The switching between configurations related to transmission of control information may be, for example, switching between resources (e.g., carriers or cells) used for transmitting the control information. The switching between resources used for transmitting the control information may also be referred to as "PUCCH carrier switching." Further, as the UE capability information of the terminal, information indicating application of dynamic PUCCH carrier switching and/or semi-static PUCCH carrier switching may be specified.

A configuration operation of the semi-static PUCCH carrier switching may be based on RRC configured with a PUCCH cell timing pattern of a PUCCH cell to which the semi-static PUCCH carrier switching is applied. The configuration operation of the semi-static PUCCH carrier switching may also be supported between cells having different numerology.

In the PUCCH carrier switching, a PUCCH resource may be configured per Uplink Bandwidth Part (UL BWP) (e.g., per candidate cell and per UL BWP of candidate cell).

In the case of PUCCH carrier switching based on dynamic indication of control information, a K1 value (offset) from PDSCH to HARQ-ACK may be interpreted based on numerology of a target PUCCH cell to be dynamically indicated. Note that the control information may be control information for PUCCH scheduling, such as Downlink Control Information (DCI). Further, the numerology may be regarded as a slot or a Subcarrier Spacing (SCS).

In URLLC, studies have been carried on a functional enhancement of HARQ-ACK Codebook (HARQ-ACK CB) feedback of a terminal. Hereinafter, outlines of a Type-1 HARQ-ACK CB and a Type-2 HARQ-ACK CB will be described (see 3GPP TS38.213 (Rel. 16) for more details).

Note that the Type-1 HARQ-ACK CB may be referred to as a semi-static HARQ-ACK CB. The Type-2 HARQ-ACK CB may be referred to as a dynamic HARQ-ACK CB.

For example, higher layer signaling such as RRC may indicate, to the terminal, as to which of the Type-1 HARQ-ACK CB and the Type-2 HARQ-ACK CB is applied.

<Type-1 HARQ-ACK CB>

Figure 3:
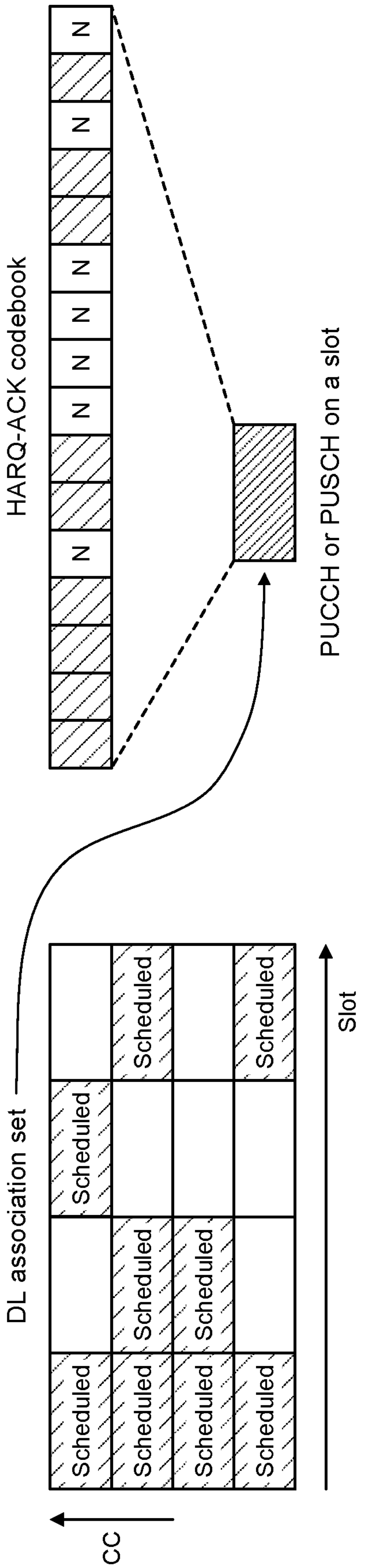
FIG. 3 is a diagram for describing an outline of a Type-1 HARQ-ACK CB.

FIG. 3 is a diagram for describing an outline of the Type-1 HARQ-ACK CB. The terms "scheduled" illustrated in FIG. 3 each represent, for example, a slot scheduled by a DCI. The CC represents a Component Carrier.

In the Type-1 HARQ-ACK CB, the terminal generates HARQ-ACK bits for PDSCH regardless of whether a scheduled slot (PDSCH) is present. For example, as illustrated in the "HARQ-ACK codebook" in FIG. 3, the terminal may configure an unscheduled PDSCH with NACKs.

<Type-2 HARQ-ACK CB>

Figure 4:
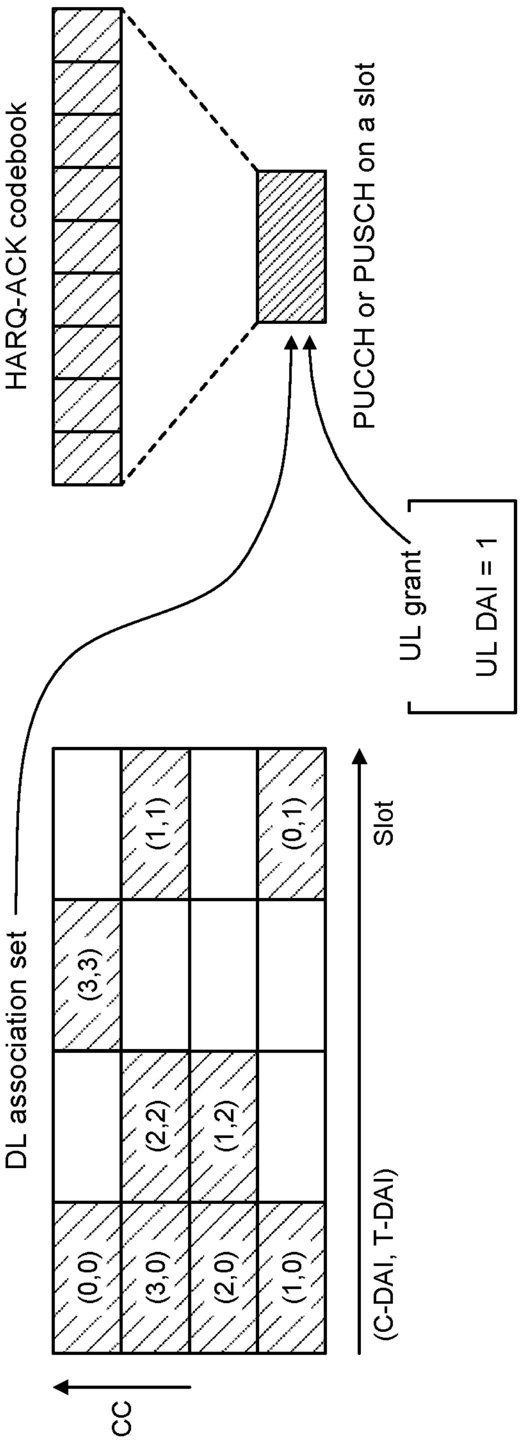
FIG. 4 is a diagram for describing an outline of a Type-2 HARQ-ACK CB.

FIG. 4 is a diagram for describing an outline of the Type-2 HARQ-ACK CB. The coordinates (x, y) indicated in FIG. 4 represent, for example, a slot scheduled by a DCI. The x corresponds to a C-DAI value, and the y corresponds to a T-DAI value. The DAI is abbreviation for a Downlink assignment index. The DAI represents, for example, assignment of a scheduled PDSCH in which HARQ-ACKs are bundled to an HARQ-ACK CB.

In the Type-2 HARQ-ACK CB, the terminal generates HARQ-ACK bits for a scheduled PDSCH. For example, as illustrated in the "HARQ-ACK codebook" in FIG. 4, the terminal may configure a scheduled PDSCH with HARQ-ACKs.

Note that the C-DAI is counted up from one. For example, in the case of a two-bit field, the C-DAI is repeated as in 1→2→3→0→ and so forth. The C-DAI is counted up per slot and per DCI reception occasion of each CC, and is counted up from the final value of the previous slot even when the slot changes. The T-DAI represents the final C-DAI value of each slot.

Next, a generation example of the Type-1 HARQ-ACK CB will be described.

<Generation of Type 1 HARQ-ACK CB>

Figure 5:
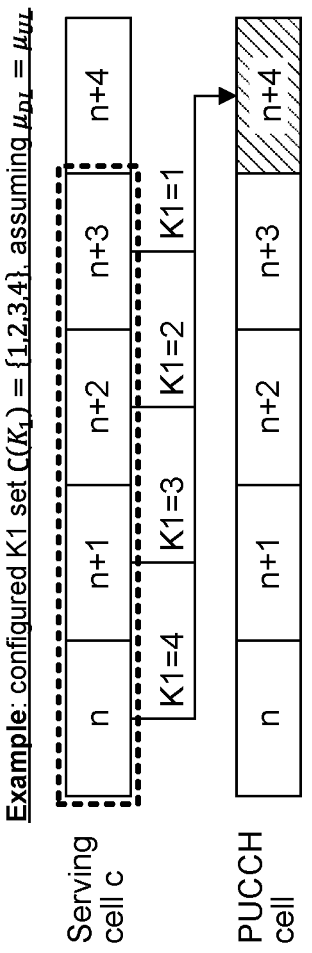
FIG. 5 is a diagram for describing a generation example of the Type-1 HARQ-ACK CB.
Figure 6:
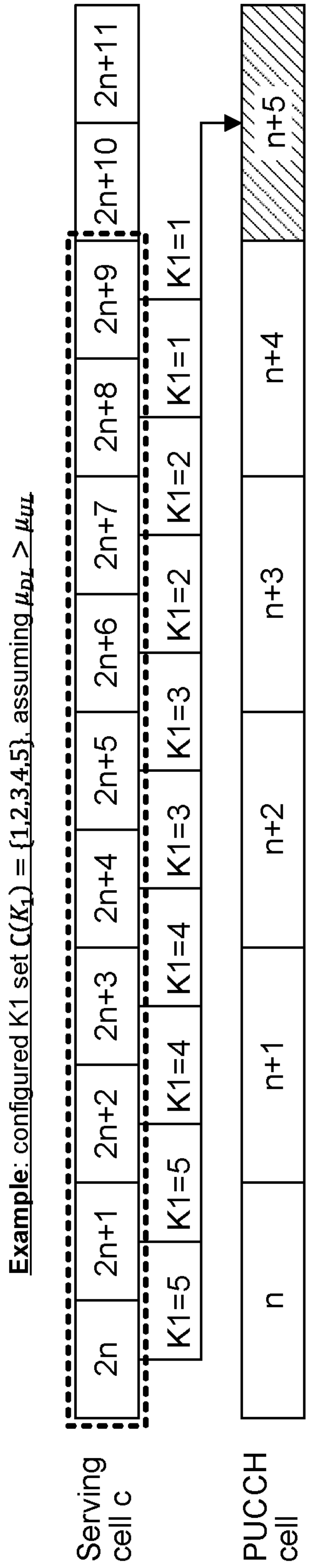
FIG. 6 is a diagram for describing another generation example of the Type-1 HARQ-ACK CB.
Figure 7:
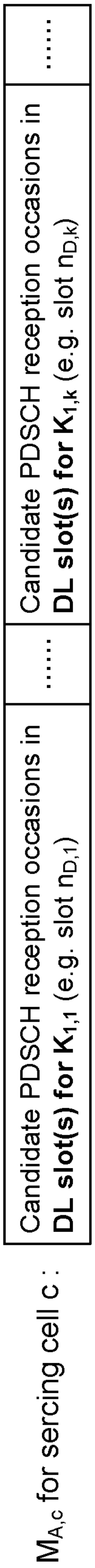
FIG. 7 is a diagram for describing still another generation example of the Type-1 HARQ-ACK CB.

FIGS. 5, 6, and 7 are diagrams each for describing a generation example of the Type-1 HARQ-ACK CB. FIG. 5 assumes that numerology of a serving cell and numerology of a PUCCH cell are identical with each other. In FIG. 5, a set of K1 (offset from PDSCH to HARQ-ACK) is {1,2,3,4}.

FIG. 6 assumes that numerology of a serving cell is different from numerology of a PUCCH cell. In FIG. 6, the K1 set is {1, 2, 3, 4, 5}.

The terminal may generate an HARQ-ACK CB based on Step A, Step A-1, Step A-2, and Step B described below.

Step A

The terminal determines an HARQ-ACK occasion for candidate PDSCH reception.

For example, in FIG. 5, the terminal determines the n+4 slot of the PUCCH cell. For example, in FIG. 6, the terminal determines the n+5 slot of the PUCCH cell.

Step A-1

The terminal determines a PDSCH slot window based on a K1 set. For example, the terminal interprets the K1 set in numerology of a PUCCH cell and determines the PDSCH slot window indicated by the dotted frame of FIG. 5 or 6.

Step A-2

The terminal determines a candidate PDSCH reception occasion in each slot for each K1. For example, as illustrated in $M_{A,c}$ in FIG. 7, the terminal determines a candidate PDSCH reception occasion in each slot.

Note that, the candidate PDSCH reception occasion is related to a set R (Row index) of a Time Domain Resource Allocation (TDRA) table. A candidate PDSCH reception occasion in the TDRA table, which overlaps with UL configured by TDD-UL-DL-ConfigurationCommon and TDD-UL-DL-ConfigDedicated, is excluded. With respect to a candidate PDSCH reception occasion that overlaps in a time domain, the candidate PDSCH reception occasion is determined based on a specific rule.

Step B

The terminal may determine (generate) HARQ-ACK (HARQ-ACK information bit, HARQ-ACK CB) in each element of the determined candidate PDSCH reception occasion. For example, the terminal may generate the following Type-1 HARQ-ACK CB in total number $O^{ACK}$ of HARQ-ACK information bits.

[1]

$$\tilde{o}_0^{ACK}, \tilde{o}_1^{ACK}, \ldots, \tilde{o}_{O^{ACK}-1}^{ACK} \quad \text{(Expression 1)}$$

Next, a generation example of an SPS HARQ-ACK CB will be described. Note that the SPS HARQ-ACK CB may be regarded as a CB for HARQ-ACK for SPS PDSCH. For example, a transmission period of SPS PDSCH is configured by RRC. Further, a transmission timing (K1) of HARQ-ACK for SPS PDSCH is configured by RRC, for example. SPS PDSCH is activated (activation) and deactivated (deactivation/release) by a DCI, for example. Hereinafter, the DCI that deactivates SPS PDSCH may be referred to as a deactivation DCI. The terminal also transmits HARQ-ACK to the deactivation DCI.

<Type 2 HARQ-ACK CB or Type 1 HARQ-ACK CB with Only SPS PDSCH Receptions>

For the Type-1 HARQ-ACK CB only in SPS PDSCH reception, HARQ-ACKs may be ordered as follows.

Figure 8:
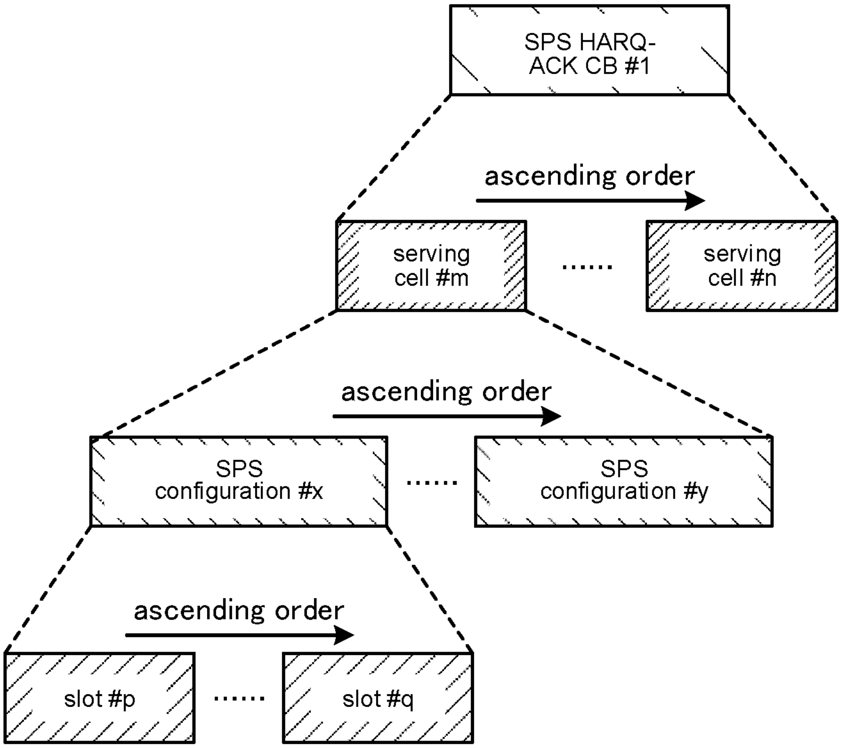
FIG. 8 is a diagram for describing an example of HARQ-ACK ordering in a Type-1 HARQ-ACK CB for SPS PDSCHs.

FIG. 8 is a diagram for describing an example of HARQ-ACK ordering in a Type-1 HARQ-ACK CB for SPS PDSCH. HARQ-ACKs for SPS PDSCH are arranged in ascending order of DL slot numbers in each SPS configuration index of each serving cell index. The HARQ-ACKs for SPS PDSCH are then arranged in ascending order of the SPS configuration indices in each serving cell index. The HARQ-ACKs for SPS PDSCH are then arranged in ascending order of the serving cell indices.

In the Type-2 HARQ-ACK CB in SPS PDSCH reception, HARQ-ACKs may be ordered in the same way as in the Type-1 HARQ-ACK CB described above. Note that, in the Type-2 HARQ-ACK CB, in a case where HARQ-ACK for the SPS PDSCH reception is multiplexed with HARQ-ACK for a dynamically scheduled PDSCH reception and/or HARQ-ACK for the deactivation DCI, HARQ-ACK (bits) for the SPS PDSCH reception is added following (following in time) the HARQ-ACK (bits) for the dynamically scheduled PDSCH reception and/or the HARQ-ACK (bits) for the deactivation DCI.

<Multiplexing of Dynamic and/or SPS HARQ-ACK(s)>

Incidentally, in the terminal, overlapping of slots for dynamic HARQ-ACKs (e.g., HARQ-ACKs whose transmission timings are dynamically determined (scheduled) by DCI) (hereinafter may also be referred to as "dynamic HARQ-ACK slot") in different carriers (cells) may not be assumed, and overlapping of SPS HARQ-ACK slots in different carriers (cells) may not be assumed. In other words, in the terminal, the overlapping between dynamic HARQ-ACK slots in different carriers may not be assumed, and the overlapping between SPS HARQ-ACK slots in different carriers may not be assumed.

Thus, the terminal may transmit dynamic HARQ-ACK and SPS HARQ-ACK in a multiplexed manner, assuming overlapping between a dynamic HARQ-ACK slot and an SPS HARQ-ACK slot.

For example, when a dynamic HARQ-ACK slot and an SPS HARQ-ACK slot overlap with each other on the same carrier, the terminal may multiplex and transmit dynamic HARQ-ACK and SPS HARQ-ACK. Specifically, when the dynamic HARQ-ACK slot and the SPS HARQ-ACK slot overlap with each other in the same slot of a certain carrier, the terminal may multiplex and transmit the dynamic HARQ-ACK and the SPS HARQ-ACK in the same slot of the certain carrier.

On the other hand, when a dynamic HARQ-ACK slot and an SPS HARQ-ACK slot overlap with each other on different carriers, the terminal may multiplex and transmit dynamic HARQ-ACK and SPS HARQ-ACK based on the following Opt. 1 or Opt. 2.

<Opt. 1>

The terminal may map slots for the dynamic HARQ-ACK and the SPS HARQ-ACK in a slot for a dedicated cell corresponding to the slots for the dynamic HARQ-ACK and the SPS HARQ-ACK (may multiplex and transmit dynamic HARQ-ACK and SPS HARQ-ACK).

The dedicated cell may be a default cell defined by specifications. For example, the dedicated cell may be a Pcell, a Pscell, or a PUCCH-Scell. Further, the dedicated cell may be configured based on RRC.

For example, a cell with the largest SCS may be selected as the dedicated cell. This can suppress the latency in HARQ-ACK of the terminal.

Figure 9:
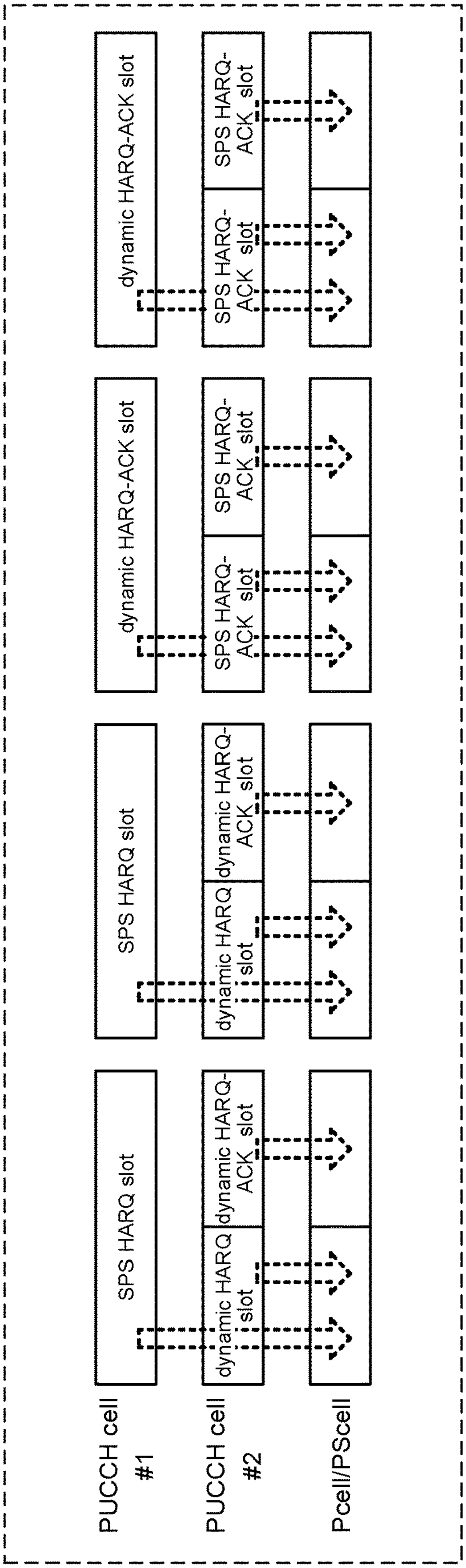
FIG. 9 is a diagram for describing an example of Opt. 1.

FIG. 9 is a diagram for describing an example of Opt. 1. In FIG. 9, numerology of PUCCH cell #1 is different from numerology of PUCCH cell #2. FIG. 9 illustrates four examples of overlapping of dynamic HARQ-ACK slots and SPS HARQ-ACK slots on different carriers (PUCCH cell #1 and PUCCH cell #2). Dynamic HARQ-ACKs and SPS HARQ-ACKs that overlap with each other on different carriers may be mapped to slots for dedicated cells corresponding to slots for the dynamic HARQ-ACK and the SPS HARQ-ACK (PCell/PScell in example of FIG. 9).

<Opt. 2>

SPS HARQ-ACK may be multiplexed in a corresponding dynamic HARQ-ACK slot. In other words, the terminal may multiplex and transmit the SPS HARQ-ACK with the dynamic HARQ-ACK in the dynamic HARQ-ACK slot corresponding to an SPS HARQ-ACK slot.

<Opt. 2-1>

When one SPS HARQ-ACK slot overlaps with a plurality of dynamic HARQ-ACK slots, the terminal may multiplex SPS HARQ-ACK and dynamic HARQ-ACK based on the following Alt. 1 or Alt. 2.

<Alt. 1>

The terminal may multiplex the SPS HARQ-ACK with dynamic HARQ-ACK in the first dynamic HARQ-ACK slot or the last dynamic HARQ-ARQ slot, of the plurality of dynamic HARQ-ACK slots corresponding to (overlapping with) the one SPS HARQ-ACK slot.

Figure 10:
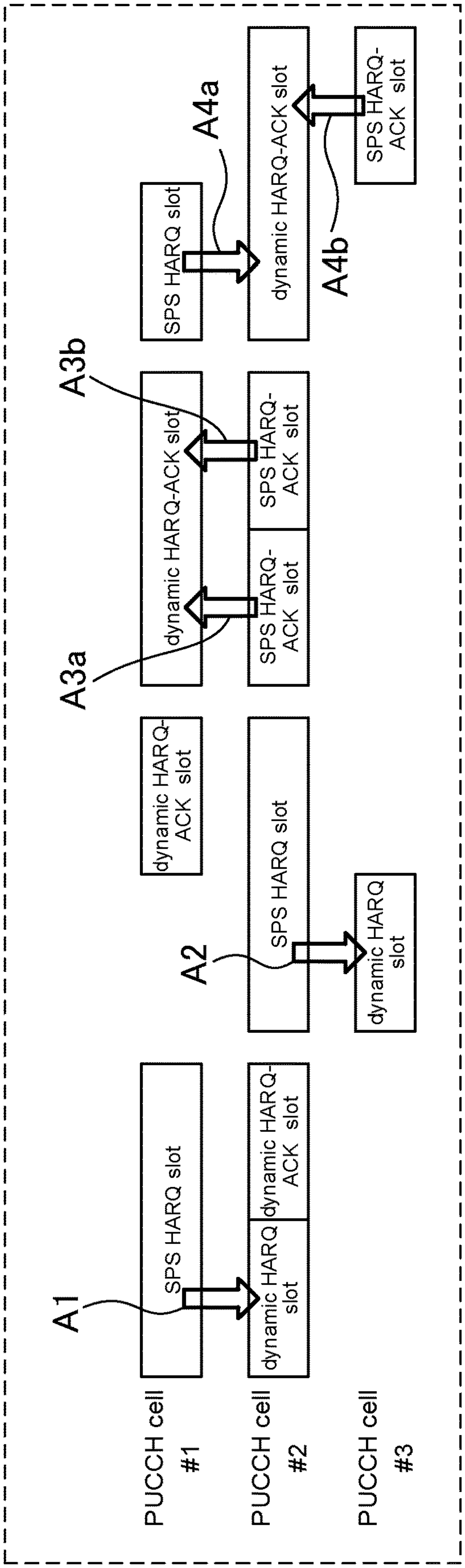
FIG. 10 is a diagram for describing an example of Opt. 2.

FIG. 10 is a diagram for describing an example of Opt. 2. In FIG. 10, the numerology of PUCCH cell #1 is different from the numerology of PUCCH cell #2. FIG. 10 illustrates four examples of overlapping of dynamic HARQ-ACK slots and SPS HARQ-ACK slots on different carriers (PUCCH cell #1 and PUCCH cell #2).

For example, as indicated by arrow A1 in FIG. 10, the terminal may multiplex the SPS HARQ-ACK and the dynamic HARQ-ACK in the first dynamic HARQ-ACK slot of the two dynamic HARQ-ACK slots overlapping with one SPS HARQ-ACK slot. Further, as indicated by arrow A2 in FIG. 10, the terminal may multiplex the SPS HARQ-ACK with the dynamic HARQ-ACK in the first dynamic HARQ-ACK slot of the two dynamic HARQ-ACK slots overlapping with the one SPS HARQ-ACK slot.

<Alt. 2>

The terminal may multiplex SPS HARQ-ACK with dynamic HARQ-ACK in a dynamic HARQ-ACK slot with the smallest cell index, the largest cell index, or the nearest cell index, of the plurality of dynamic HARQ-ACK slots corresponding to the one SPS HARQ-ACK slot.

For example, as indicated by arrow A2 in FIG. 10, the terminal may multiplex the SPS HARQ-ACK with the dynamic HARQ-ACK in the dynamic HARQ-ACK slot with the largest cell index (cell index #3) of the two dynamic HARQ-ACK slots (cell indices #1 and #3) corresponding to the one SPS HARQ-ACK slot.

<Opt. 2-2>

When a plurality of SPS HARQ-ACK slots overlaps with the same (one) dynamic HARQ-ACK slot, the terminal may multiplex SPS HARQ-ACK and dynamic HARQ-ACK based on the following Alt. 1 or Alt. 2.

<Alt. 1>

When the plurality of SPS HARQ-ACK slots overlaps with the same dynamic HARQ-ACK slot, the terminal may handle it as an error.

<Alt. 2>

When the plurality of SPS HARQ-ACK slots overlaps with the same dynamic HARQ-ACK slot, the terminal may multiplex SPS HARQ-ACKs of the plurality of SPS HARQ-ACK slots with the dynamic HARQ-ACK of the same dynamic HARQ-ACK slot.

For example, as indicated by arrows A3*a* and A3*b* of FIG. 10, the terminal may multiplex the plurality of SPS HARQ-ACKs with the dynamic HARQ-ACK of the same dynamic HARQ-ACK slot. Further, as indicated by arrows A4*a* and A4*b* of FIG. 10, the terminal may multiplex the plurality of SPS HARQ-ACKs with the dynamic HARQ-ACK of the same dynamic HARQ-ACK slot.

<Opt. 3>

Dynamic HARQ-ACK may be multiplexed in a corresponding SPS HARQ-ACK slot. In other words, the terminal may multiplex the dynamic HARQ-ACK with SPS HARQ-ACK in a slot for the SPS HARQ-ACK corresponding to the slot for the dynamic HARQ-ACK. For example, "dynamic HARQ-ACK" described in Opt.2 may be replaced with "SPS HARQ-ACK," and "SPS HARQ-ACK" described in Opt.2 may be replaced with "dynamic HARQ-ACK."

Incidentally, in multiplexing between a dynamic HARQ-ACK slot and an SPS HARQ-ACK slot, a carrier (cell) in which the SPS HARQ-ACK slot is transmitted may be different from a carrier in which SPS PDSCH is transmitted (i.e., PUCCH carrier switching may be performed). A carrier in which the dynamic HARQ-ACK slot is transmitted may be different from a carrier in which dynamic PDSCH (PDSCH scheduled by DCI) is transmitted (i.e., PUCCH carrier switching may be performed).

There is scope for study on, however, generation of an HARQ-ACK CB when a dynamic HARQ-ACK slot and an SPS HARQ-ACK slot overlap with each other on different cells. In the present embodiment, an HARQ-ACK CB is appropriately generated in multiplexing between a dynamic HARQ-ACK slot and an SPS HARQ-ACK slot that overlap with each other on different cells.

<Proposal 1>

Proposal 1 describes multiplexing of Type-2 HARQ-ACK CBs when a dynamic HARQ-ACK slot and an SPS HARQ-ACK slot are multiplexed in different PUCCH cells. In a Type-2 HARQ-ACK CB, the terminal may add an SPS HARQ-ACK CB following a dynamic HARQ-ACK CB.

When multiplexing a plurality of SPS HARQ-ACK CBs from different slots with the same HARQ-ACK CB on the dynamic HARQ-ACK slot, the terminal may multiplex based on the following Alt. 1 or Alt. 2. The plurality of SPS HARQ-ACK CBs from the different slots may be a plurality of SPS HARQ-ACK CBs of different slots on the same PUCCH cell (see, e.g., diagram on left side of FIG. 11) or a plurality of SPS HARQ-ACK CBs on different PUCCH cells (see, e.g., second diagram from left of FIG. 10 and diagram on right side of FIG. 10).

<Alt. 1>

The terminal may add the plurality of SPS HARQ-ACK CBs (a plurality of original SPS HARQ-ACK CBs) one by one following the dynamic HARQ-ACK CB.

The order of the plurality of SPS HARQ-ACK CBs may be determined based on the start and/or end of the original SPS HARQ-ACK slots (time-passage order and/or reverse order thereof). Alternatively, the order of the plurality of SPS HARQ-ACK CBs may be determined based on the cell indices of SPS HARQ-ACK slots.

Figure 11:
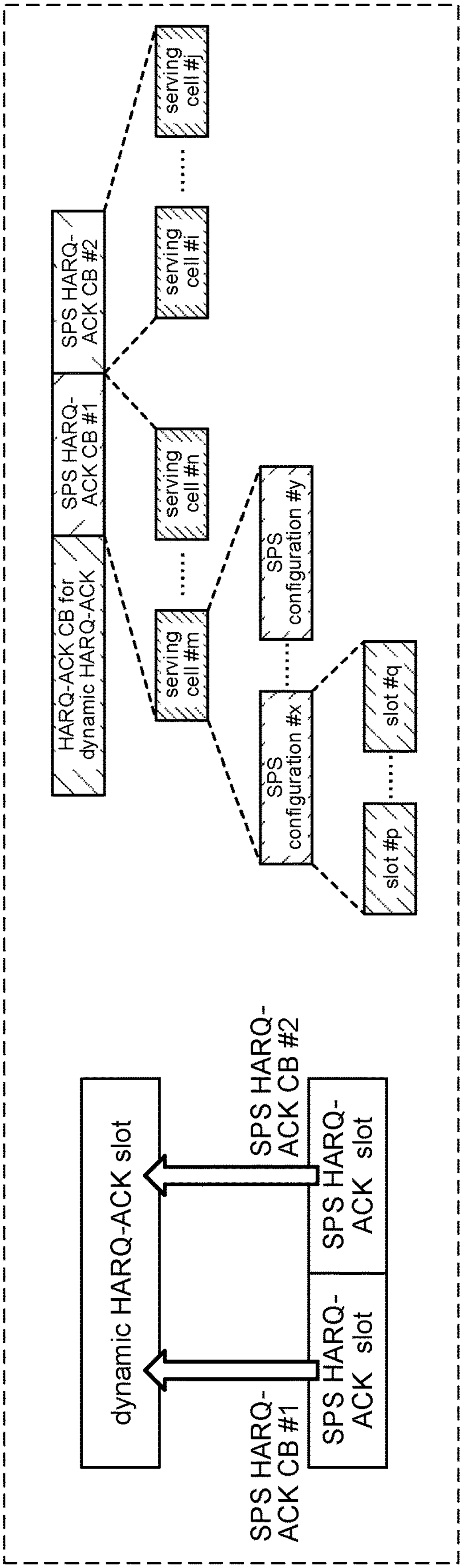
FIG. 11 is a diagram for describing an exemplary operation in Alt. 1 of Proposal 1.

FIG. 11 is a diagram for describing an exemplary operation in Alt. 1 of Proposal 1. On a left side of FIG. 11, examples of different SPS HARQ-ACK slots on the same PUCCH cell are illustrated. The dynamic HARQ-ACK slot and the two SPS HARQ-ACK slots illustrated on the left side of FIG. 11 are on different PUCCH cells. The SPS HARQ-ACK slot in which SPS HARQ-ACK CB #1 is transmitted and the SPS HARQ-ACK slot in which SPS HARQ-ACK CB #2 is transmitted overlap with the dynamic HARQ-ACK slot in which the dynamic HARQ-ACK CB is transmitted.

The terminal may add SPS HARQ-ACK CB #1 and SPS HARQ-ACK CB #2 of the two SPS HARQ-ACK slots one by one following the dynamic HARQ-ACK CB, as illustrated in the diagram on a right side of FIG. 11. In the example of FIG. 11, according to the time-passage order of the two SPS HARQ-ACK slots, SPS HARQ-ACK CB #1 is firstly added following the dynamic HARQ-ACK CB, and SPS HARQ-ACK CB #2 is then added following SPS HARQ-ACK CB #1.

<Alt. 2>

In accordance with the ordering defined by TS38.213 in Rel. 16, the terminal may rearrange (re-order) HARQ-ACK bits of the plurality of SPS HARQ-ACK CBs and generate (re-generate) an SPS HARQ-ACK CB.

Figure 12:
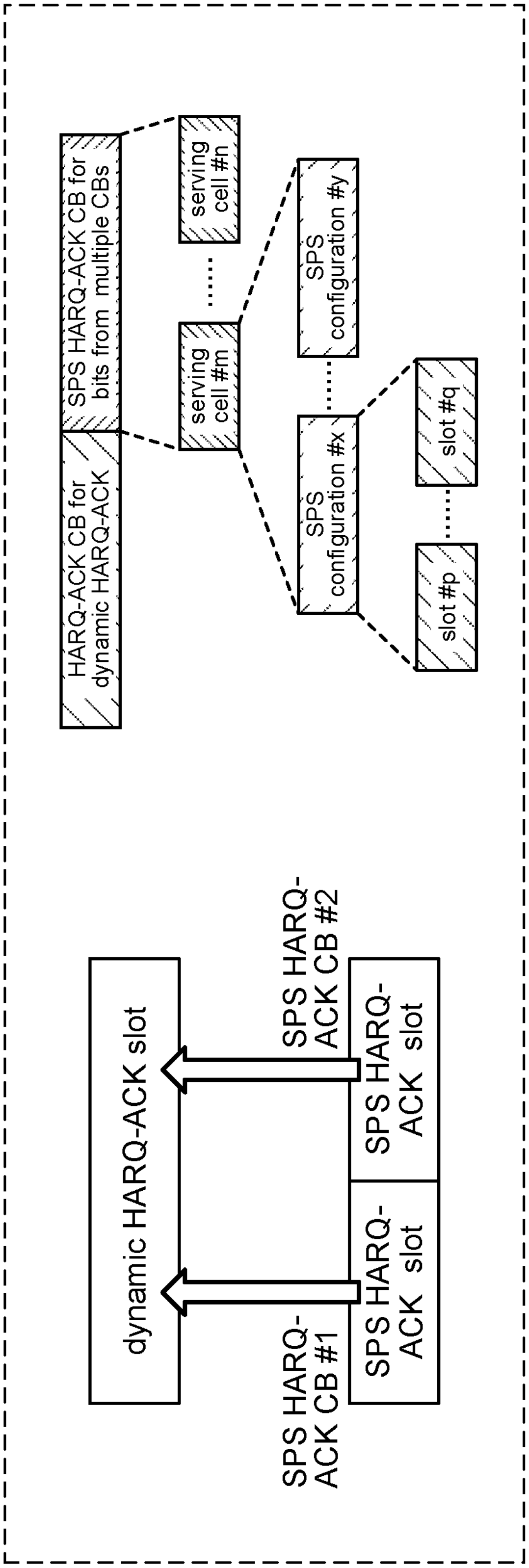
FIG. 12 is a diagram for describing an exemplary operation in Alt. 2 of Proposal 1.

FIG. 12 is a diagram for describing an exemplary operation in Alt. 2 of Proposal 1. In Alt. 2, SPS HARQ-ACKs of SPS HARQ-ACK CB #1 and SPS HARQ-ACK CB #2 illustrated on a left side of FIG. 12 may be re-ordered in accordance with the ordering defined by TS38.213 in Rel. 16. That is, the terminal may re-order the SPS HARQ-ACKs of SPS HARQ-ACK CB #1 and of SPS HARQ-ACK CB #2 together and thereby generate one SPS HARQ-ACK CB. The terminal may add the generated SPS HARQ-ACK CB following the dynamic HARQ-ACK CB.

In Proposal 1, a dynamic HARQ-ACK CB and an SPS HARQ-ACK CB may be multiplexed in the same PUCCH cell as that for the dynamic HARQ-ACK slot or may be multiplexed in the same PUCCH cell as that for the SPS HARQ-ACK slot. The dynamic HARQ-ACK CB and the SPS HARQ-ACK CB may also be multiplexed in a cell that is different from PUCCH cells for the dynamic HARQ-ACK slot and for the SPS HARQ-ACK slot.

Further, although a case has been described where an SPS HARQ-ACK CB is added following a dynamic HARQ-ACK CB, the present disclosure is not limited to this case. The dynamic HARQ-ACK CB may be added following the SPS HARQ-ACK CB.

<Proposal 2>

Proposal 2 describes multiplexing of Type-1 HARQ-ACK CBs when a dynamic HARQ-ACK slot and an SPS HARQ-ACK slot are multiplexed in different PUCCH cells. Note that, the dynamic HARQ-ACK slot may be referred to as a reporting slot. A target cell may be regarded as a cell for transmitting PUCCH (UCI such as HARQ-ACK and/or HARQ-ACK CB).

<Opt. 1>

In Opt. 1, determination of a candidate PDSCH slot set window may be extended. In Opt. 1, a candidate PDSCH slot corresponding to a slot on another PUCCH cell (SPS HARQ-ACK cell) that overlaps with a reporting slot may be added to the candidate PDSCH slot set for generation of the Type-1 HARQ-ACK CB.

Figure 13:
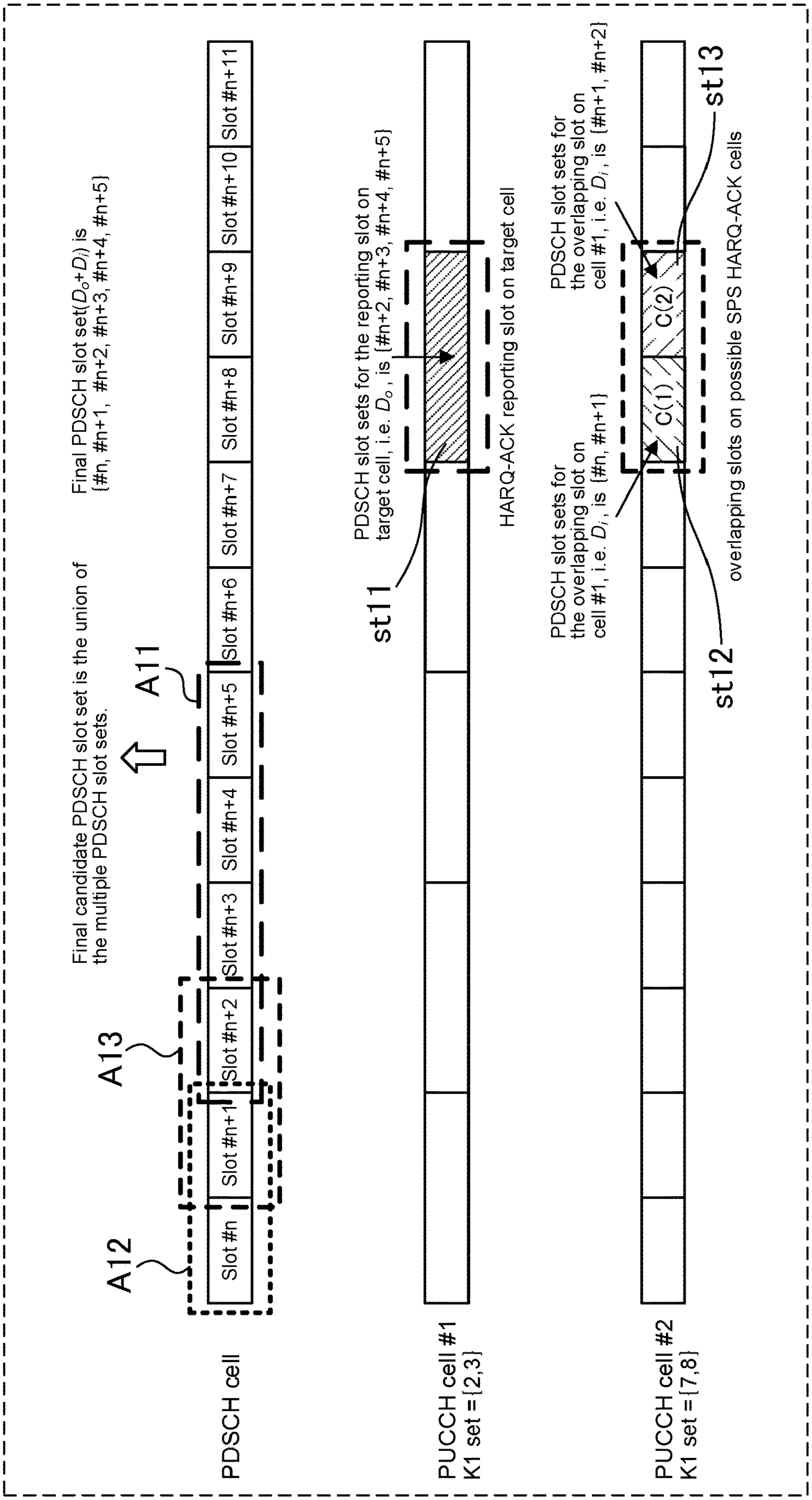
FIG. 13 is a diagram for describing an example of Opt. 1 of Proposal 2.

FIG. 13 is a diagram for describing an example of Opt. 1 of Proposal 2. The terminal may determine (generate) a candidate PDSCH slot set based on the following Step 1 to Step 4.

Step 1

The terminal determines a candidate PDSCH slot set for a dynamic HARQ-ACK slot on a target cell, based on a K1 set that has been configured as the target cell. Here, the determined PDSCH candidate slot set is referred to as Do.

For example, in FIG. 13, a candidate PDSCH slot set for the dynamic HARQ-ACK slot on PUCCH cell #1 (st11 illustrated in FIG. 13) is slots surrounded by dotted frame A11, based on "K1 set=2, 3." Hence, the PDSCH candidate slot set, $D_0$, becomes {#n+2, #n+3, #n+4, #n+5}.

Step 2

The terminal searches for an SPS HARQ-ACK slot on an SPS HARQ-ACK cell that overlaps with the dynamic HARQ-ACK slot on the target cell. Here, an overlapping slot set on the SPS HARQ-ACK PUCCH cell is assumed as C. Incidentally, i in C(i) denotes the i-th slot in the set.

For example, in FIG. 13, SPS HARQ-ACK slots on the SPS HARQ-ACK cell (PUCCH cell #2) overlapping with the dynamic HARQ-ACK slot are st12 and st13. Thus, overlapping slot set C on the SPS HARQ-ACK PUCCH cell corresponds to st12 and st13. C(1)=st12, and C(2)=st13.

Step 3

The terminal determines a candidate PDSCH slot set for each slot in set C, based on the K1 set configured as the corresponding PUCCH cell. The PDSCH slot set determined for slot C(i) is denoted by $D_i$.

For example, in FIG. 13, the K1 set for PUCCH cell of set C is "K1 set=7, 8." Hence, the candidate PDSCH slot set, $D_i$, for slot C(1) becomes slots surrounded by dotted frame A12, that is {#n, #n+1}. The candidate PDSCH slot set, $D_i$, for slot C(2) becomes slots surrounded by dotted frame A13, that is {#n+1, #n+2}.

Step 4

The terminal determines a union of $D_0$ and each $D_i$ as a final candidate PDSCH slot set.

For example, in FIG. 13, the union of $D_0$ {#n+2, #n+3, #n+4, #n+5}, $D_i$ {#n, #n+1}, and $D_i$ {#n+1, #n+2} is {#n, #n+1, #n+2, #n+3, #n+4, #n+5}. Thus, the final candidate PDSCH slot set becomes {#n, #n+1, #n+2, #n+3, #n+4, #n+5}.

For the determined final candidate PDSCH slot set, the terminal determines a candidate PDSCH reception occasion ($M_{A,c}$), based on the rules of TS38.213 in Rel. 16, for example. The terminal determines (generates) HARQ-ACK for each element of the determined candidate PDSCH reception occasion and generates a Type-1 HARQ-ACK CB.

The generated Type-1 HARQ-ACK CB may be generated in the same PUCCH cell as that for the dynamic HARQ-ACK slot or may be generated in the same PUCCH cell as that for the SPS HARQ-ACK slot. Further, the generated Type-1 HARQ-ACK CB may be generated in a cell that is different from PUCCH cells for the dynamic HARQ-ACK slot and for the SPS HARQ-ACK slot.

Further, SPS HARQ-ACK slots may be present on different cells. For example, slots st12 and st13 illustrated in FIG. 13 may be present on different cells.

<Opt. 2>

The terminal may add a CB for an SPS HARQ-ACK slot that overlaps with a dynamic HARQ-ACK slot on a target cell and that is on another PUCCH cell, following a Type-1 HARQ-ACK CB (original Type-1 HARQ-ACK CB) for the dynamic HARQ-ACK slot on the target cell.

<Opt. 2-1>

The terminal may generate a specific HARQ-ACK CB for each slot on different cells.

Figure 14:
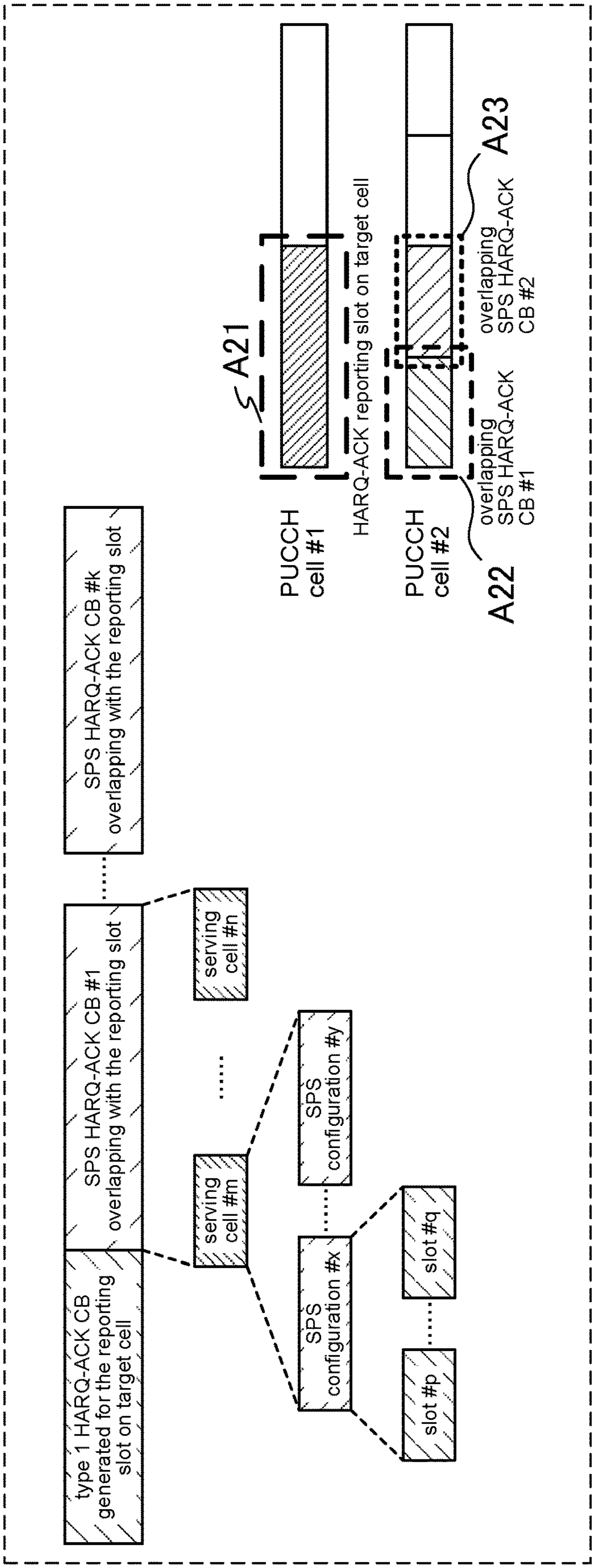
FIG. 14 is a diagram for describing an example of Opt. 2-1 of Proposal 2.

FIG. 14 is a diagram for describing an example of Opt. 2-1 of Proposal 2. The terminal may multiplex a dynamic HARQ-ACK CB and an SPS HARQ-ACK CB, based on the following Step 1 to Step 3.

Step 1

The terminal generates, for example, a Type-1 HARQ-ACK CB (dynamic HARQ-ACK CB) for the dynamic HARQ-ACK slot on the target cell in accordance with the rules of TS38.213 in Rel. 16.

For example, the terminal generates the Type-1 HARQ-ACK CB (type 1 HARQ-ACK CB illustrated in FIG. 14) for the dynamic HARQ-ACK slot indicated by dotted frame A21 of FIG. 14.

Step 2

The terminal generates an SPS HARQ-ACK CB for each SPS HARQ-ACK slot on different cells that overlaps with the dynamic HARQ-ACK slot on the target cell.

For example, the terminal generates an SPS HARQ-ACK CB (SPS HARQ-ACK CB #1 illustrated in FIG. 14) for the SPS HARQ-ACK slot indicated by dotted frame A22 of FIG. 14. Further, the terminal generates an SPS HARQ-ACK CB (SPS HARQ-ACK CB #1 illustrated in FIG. 14) for the SPS HARQ-ACK slot indicated by dotted frame A23 of FIG. 14. Incidentally, ordering of HARQ-ACKs of the SPS HARQ-ACK CBs may be performed in accordance with the manner described in FIG. 8.

Step 3

The terminal adds the SPS HARQ-ACK CBs generated in Step 2, following the Type-1 HARQ-ACK CB (original Type-1 HARQ-ACK CB) generated in Step 1.

For example, the terminal adds SPS HARQ-ACK CB #1 for the SPS HARQ-ACK slot indicated by dotted frame A22, following the Type 1 HARQ-ACK CB illustrated in FIG. 14. The terminal adds SPS HARQ-ACK CB #2 for the SPS HARQ-ACK slot indicated by dotted frame A23, following SPS HARQ-ACK CB #1 illustrated in FIG. 14.

In a case where a plurality of SPSHARQ-ACK CBs is added, the order of the plurality of SPSHARQ-ACK CBs may be determined based on SPS HARQ-ACK cell indices and/or the start and/or end of the SPS HARQ-ACK slots (time-passage order and/or reverse order thereof).

In addition, although a case has been described where an SPS HARQ-ACK CB is added following a Type-1 HARQ-ACK CB, the present disclosure is not limited to this case. The Type-1 HARQ-ACK CB may be added following the SPS HARQ-ACK CB.

<Opt. 2-2>

The terminal may add one SPS HARQ-ACK CB (single SPSHARQ-ACK CB) on the SPS HARQ-ACK cell, following the Type-1 HARQ-ACK CB (dynamic HARQ-ACK CB) on the target PUCCH cell.

Figure 15:
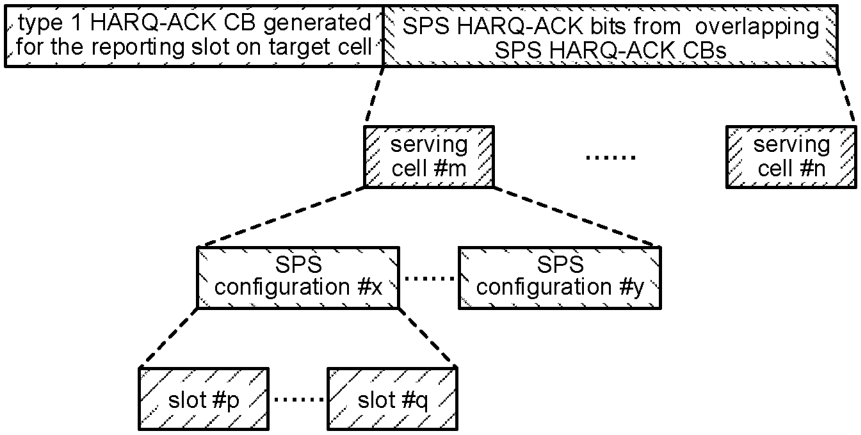
FIG. 15 is a diagram for describing an example of Opt. 2-2 of Proposal 2.

FIG. 15 is a diagram for describing an example of Opt. 2-2 of Proposal 2. The terminal may multiplex a dynamic HARQ-ACK CB and an SPS HARQ-ACK CB, based on the following Step 1 to Step 4.

Step 1

The terminal generates a Type-1 HARQ-ACK CB for the dynamic HARQ-ACK slot on the target cell in accordance with, for example, the rules of TS38.213 in Rel. 16. For example, the terminal generates the Type-1 HARQ-ACK CB illustrated in FIG. 15.

Step 2

The terminal determines a corresponding candidate SPS PDSCH occasion for each slot that overlaps with the dynamic HARQ-ACK slot on the target cell and that is on an SPS HARQ-ACK cell.

Step 3

The terminal determines a union of the candidate SPS PDSCH occasions determined in Step 2 and re-orders HARQ-ACK bits for the candidate SPS PDSCH occasions in the union. The HARQ-ACK bits may be re-ordered in accordance with, for example, the manner described in FIG. 8.

Step 4

The terminal adds the single SPS HARQ-ACK CB generated in Step 3, following the Type-1 HARQ-ACK CB on the target PUCCH cell.

For example, the terminal adds the single SPS HARQ-ACK CB, following the Type-1 HARQ-ACK CB illustrated in FIG. 15.

Variation

Which of the plurality of proposals is applied, which of the plurality of options is applied, and/or which of a plurality of alternatives is applied may be determined by the following methods.

It is/they are configured by parameters of a higher layer;

The UE reports it/them as UE capability(ies);

It is/they are described in the specifications;

It is/they are determined based on configuration of higher-layer parameters and reported UE capability;

It is/they are determined by a combination of two or more of the above determinations; and A slot may be replaced with a subslot.

An SPS HARQ-ACK slot may be before or after the semi-static PUCCH carrier switching. The multiplexing of the SPS HARQ-ACK and the dynamic HARQ-ACK may be performed before or after the semi-static PUCCH carrier switching. The terminal may apply the multiplexing of the SPS HARQ-ACK and the dynamic HARQ-ACK before or after the semi-static PUCCH carrier switching for the SPS HARQ-ACK.

For example, in a case where the multiplexing of the SPS HARQ-ACK and the dynamic HARQ-ACK is performed before the semi-static PUCCH carrier switching for the SPS HARQ-ACK, a multiplexing criteria (whether SPS HARQ-ACK slot and dynamic HARQ-ACK slot overlap with each other) may be determined based on an original cell for the SPS HARQ-ACK (e.g., Pcell).

Further, for example, in a case where the multiplexing of the SPS HARQ-ACK and the dynamic HARQ-ACK is performed after the semi-static PUCCH carrier switching for the SPS HARQ-ACK, the multiplexing criteria (whether SPS HARQ-ACK slot and dynamic HARQ-ACK slot overlap with each other) may be determined based on a cell after the carrier switching based on a PUCCH cell timing pattern.

The higher layer parameter may be RRC parameter and a Media Access Control Control Elements (MAC CEs), or may be a combination thereof.

The processing in Proposal 1 may be applied to the Type-1 HARQ-ACK CB. For example, the Type-2 HARQ-ACK CB described in Proposal 1 may be replaced with the Type-1 HARQ-ACK CB.

<UE Capability>

The UE capability representing the capability of the UE may include the following information indicating the capability of the UE. Note that the information representing the capability of the UE may correspond to information defining the capability of the UE.

Information defining whether the UE supports the PUCCH carrier switching;

Information defining whether the UE supports the dynamic PUCCH carrier switching;

Information defining whether the UE performs overlapping and/or multiplexing of a dynamic HARQ-AKC slot and an SPS HARQ-AKC slot on different carriers.

<Example of Radio Communication System>

Figure 16:
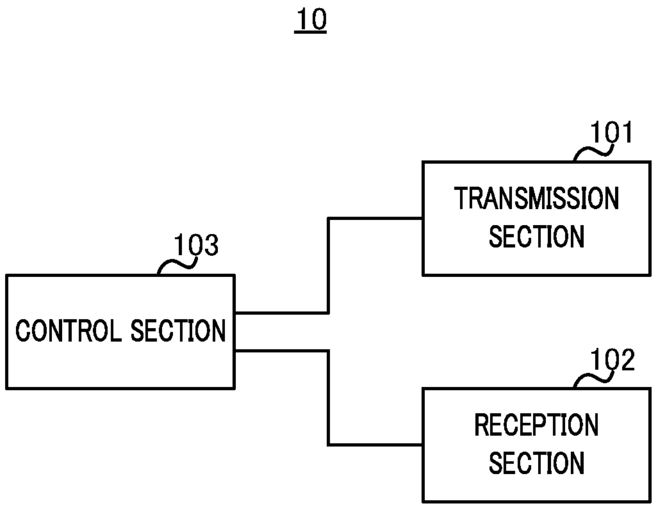
FIG. 16 is a block diagram illustrating an exemplary configuration of a base station according to the present embodiment.
Figure 17:
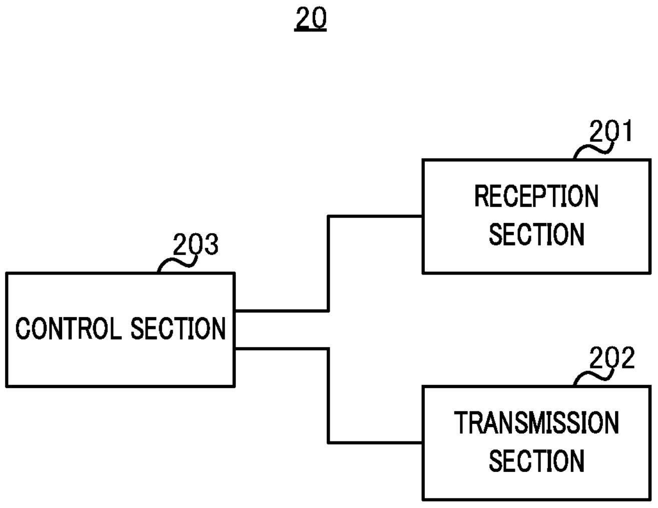
FIG. 17 is a block diagram illustrating an exemplary configuration of a terminal according to the present embodiment.

A radio communication system according to the present embodiment includes base station 10 illustrated in FIG. 16 and terminal 20 illustrated in FIG. 17. The number of base stations 10 and the number of terminals 20 are not particularly limited. For example, the system may be as illustrated in FIG. 1 in which two base stations 10 (base stations 10-1 and 10-2) communicate with one terminal 20. The radio communication system may be a radio communication system conforming to New Radio (NR). Illustratively, the radio communication system may be a radio communication system conforming to a scheme called URLLC and/or IIoT.

Note that, the radio communication system may be a radio communication system conforming to a scheme called 5G, Beyond 5G, 5G Evolution or 6G.

Base station 10 may be referred to as an NG-RAN Node, an ng-eNB, an eNodeB (eNB), or a gNodeB (gNB). Terminal 20 may be referred to as User Equipment (UE). Further, base station 10 may be regarded as an apparatus included in a network to which terminal 20 is connected.

The radio communication system may include a Next Generation-Radio Access Network (hereinafter referred to as NG-RAN). The NG-RAN includes a plurality of NG-RAN Nodes, specifically a plurality of gNBs (or ng-eNBs), and is connected to a core network (5GC, not illustrated) conforming to 5G. Note that, the NG-RAN and the 5GC may be simply represented as "network."

Base station 10 performs radio communication with terminal 20. For example, the radio communication to be performed conforms to the NR. By controlling radio signals transmitted from a plurality of antenna elements, at least one of base station 10 and terminal 20 may support Massive Multiple-Input Multiple-Output (MIMO) that generates a beam (BM) having higher directivity. Further, at least one of base station 10 and terminal 20 may support carrier aggregation (CA) that aggregates and uses a plurality of component carriers (CC). Further, at least one of base station 10 and terminal 20 may support, e.g., dual connectivity (DC) in which communication is performed between terminal 20 and each of a plurality of base stations 10.

The radio communication system may support a plurality of frequency bands. For example, the radio communication system supports Frequency Range (FR) 1 and FR 2. For example, the frequency bands of the respective FRs are as follows:

FR 1: 410 MHz to 7.125 GHz; and

FR 2: 24.25 GHz to 52.6 GHz.

In FR 1, a Sub-Carrier Spacing (SCS) of 15 kHz, 30 kHz or 60 kHz may be used, and a bandwidth (BW) of 5 MHz to 100 MHz may be used. FR 2 is, for example, a higher frequency than FR 1. In FR 2, an SCS of 60 kHz or 120 kHz may be used and a bandwidth (BW) of 50 MHz to 400 MHz may be used. FR 2 may also include an SCS of 240 kHz.

The radio communication system in the present embodiment may support a higher frequency band than the frequency band of FR 2. For example, the radio communication system in the present embodiment may support a frequency band exceeding 52.6 GHz and up to 114.25 GHz. Such a high frequency band may be referred to as "FR 2x."

Further, Cyclic Prefix-Orthogonal Frequency Division Multiplexing (CP-OFDM)/Discrete Fourier Transform-Spread-Orthogonal Frequency Division Multiplexing (DFT-S-OFDM) having a sub-carrier spacing (SCS) larger than that in the examples described above may be applied. Further, the DFT-S-OFDM may be applied to either one or both of uplink and downlink.

In the radio communication system, a slot configuration pattern of Time Division Duplex (TDD) may be configured. For example, a pattern representing the order of two or more slots among a slot for transmitting a downlink (DL) signal, a slot for transmitting an uplink (UL) signal, a slot in which a DL signal(s), a UL signal(s), and a guard symbol(s) are mixed, and a slot in which a signal to be transmitted is flexibly changed may be specified in the slot configuration pattern.

Further, in the radio communication system, it is possible to perform PUSCH (or Physical Uplink Control Channel (PUCCH)) channel estimation by using a demodulation reference signal (DMRS) per slot, but it is further allowed to perform PUSCH (or PUCCH) channel estimation by using DMRSs assigned to a plurality of slots, respectively. Such channel estimation may be referred to as joint channel estimation or may be referred to as another name, such as cross-slot channel estimation.

In a plurality of slots, terminal 20 may transmit DMRSs assigned to the plurality of slots, respectively, such that base station 10 can perform the joint channel estimation using DMRSs.

Further, in the radio communication system, an enhanced function may be added to the function of feedback from terminal 20 to base station 10. For example, an enhanced feedback function of the terminal for HARQ-ACK may be added.

Next, configurations of base station 10 and terminal 20 will be described. Note that the configurations of base station 10 and terminal 20 described below illustrate an example of functions related to the present embodiment. Base station 10 and terminal 20 may have functions that are not illustrated. Further, functional classification and/or names of functional sections are/is not limited as long as the functions serve for executing operations according to the present embodiment.

<Configuration of Base Station>

FIG. 16 is a block diagram illustrating an exemplary configuration of base station 10 according to the present embodiment. Base station 10 includes, for example, transmission section 101, reception section 102, and control section 103. Base station 10 communicates wirelessly with terminal 20 (see FIG. 17).

Transmission section 101 transmits a downlink (DL) signal to terminal 20. For example, transmission section 101 transmits the DL signal under the control of control section 103.

The DL signal may include, for example, a downlink data signal and control information (e.g., Downlink Control Information (DCI)). The DL signal may also include information (e.g., UL grant) indicating scheduling related to signal transmission of terminal 20. Moreover, the DL signal may include higher layer control information (e.g., Radio Resource Control (RRC) control information). Furthermore, the DL signal may include a reference signal.

Channels used for DL signal transmission include, for example, a data channel and a control channel. For example, the data channel may include a Physical Downlink Shared Channel (PDSCH), and the control channel may include a Physical Downlink Control Channel (PDCCH). For example, base station 10 transmits control information to terminal 20 by using PDCCH and transmits a downlink data signal by using PDSCH.

The reference signal included in the DL signal may include, for example, at least one of a Demodulation Reference Signal (DMRS), a Phase Tracking Reference Signal (PTRS), a Channel State Information-Reference Signal (CSI-RS), a Sounding Reference Signal (SRS), and a Positioning Reference Signal (PRS) for position information. For example, the reference signal such as the DMRS and the PTRS is used for demodulation of a downlink data signal and is transmitted by using PDSCH.

Reception section 102 receives an uplink (UL) signal transmitted from terminal 20. For example, reception section 102 receives the UL signal under the control of control section 103.

Control section 103 controls communication operations of base station 10 including transmission processing in transmission section 101 and reception processing in reception section 102.

By way of example, control section 103 acquires information such as data and control information from a higher layer and outputs the data and control information to transmission section 101. Further, control section 103 outputs the data, the control information, and/or the like received from reception section 102 to the higher layer.

For example, control section 103 allocates a resource (or channel) used for DL signal transmission and reception and/or a resource used for UL signal transmission and reception, based on the signal (e.g., data, control information and/or the like) received from terminal 20 and/or the data, the control information, and/or the like acquired from the higher layer. Information on the allocated resource(s) may be included in control information to be transmitted to terminal 20.

Control section 103 configures a PUCCH resource as an example of the allocation of the resource used for UL transmission and reception. Information on the PUCCH configuration such as a PUCCH cell timing pattern (PUCCH configuration information) may be indicated to terminal 20 by RRC.

<Configuration of Terminal>

FIG. 17 is a block diagram illustrating an exemplary configuration of terminal 20 according to the present embodiment. Terminal 20 includes, for example, reception section 201, transmission section 202, and control section 203. Terminal 20 communicates wirelessly with, for example, base station 10.

Reception section 201 receives a DL signal transmitted from base station 10. For example, reception section 201 receives the DL signal under the control of control section 203.

Transmission section 202 transmits an UL signal to base station 10. For example, transmission section 202 transmits the UL signal under the control of control section 203.

The UL signal may include, for example, an uplink data signal and control information (e.g., UCI). For example, information on processing capability of terminal 20 (e.g., UE capability) may also be included. Further, the UL signal may include a reference signal.

Channels used for UL signal transmission include, for example, a data channel and a control channel. For example, the data channel includes a Physical Uplink Shared Channel (PUSCH) and the control channel includes a Physical Uplink Control Channel (PUCCH). For example, terminal 20 receives control information from base station 10 by using PUCCH and transmits an uplink data signal by using PUSCH.

The reference signal included in the UL signal may include, for example, at least one of a DMRS, a PTRS, a CSI-RS, an SRS, and a PRS. For example, the reference signal such as the DMRS and the PTRS is used for demodulation of an uplink data signal and is transmitted by using an uplink channel (e.g., PUSCH).

Control section 203 controls communication operations of terminal 20 including reception processing in reception section 201 and transmission processing in transmission section 202.

By way of example, control section 203 acquires information such as data and control information from a higher layer and outputs the data and control information to transmission section 202. Further, control section 203 outputs, for example, the data, the control information, and/or the like received from reception section 201 to the higher layer.

For example, control section 203 controls transmission of information to be fed back to base station 10. The information to be fed back to base station 10 may include, for example, HARQ-ACK, Channel State Information (CSI), and a Scheduling Request (SR). The information to be fed back to base station 10 may be included in the UCI. The UCI is transmitted in a PUCCH resource.

Control section 203 configures a PUCCH resource based on the configuration information (e.g., configuration information such as PUCCH cell timing pattern and/or DCI, which are/is indicated by RRC) received from base station 10. Control section 203 determines the PUCCH resource to be used for transmitting the information to be fed back to base station 10. Under the control of control section 203, transmission section 202 transmits the information to be fed back to base station 10 in the PUCCH resource determined by control section 203.

Note that, the channels used for DL signal transmission and the channels used for UL signal transmission are not limited to the examples mentioned above. For example, the channels used for the DL signal transmission and the channels used for the UL signal transmission may include a Random Access Channel (RACH) and a Physical Broadcast Channel (PBCH). The RACH may be used for, for example, transmission of Downlink Control Information (DCI) including a Random Access Radio Network Temporary Identifier (RA-RNTI).

Control section 203 may multiplex, with each other, a first CB included in a first slot and a second CB included in a second slot, the first slot and the second slot being on different cells. The first CB is for a response signal in a dynamically-scheduled signal, and the second CB is for a response signal in a semi-persistently-scheduled signal, the second slot overlapping with the first slot. Transmission section 202 may transmit the multiplexed CBs.

The first slot may be, for example, a dynamic HARQ-ACK slot illustrated in FIG. 11. The second slot may be, for example, an SPS HARQ-ACK slot illustrated in FIG. 11. The first CB may be, for example, an HARQ-ACK CB illustrated in FIG. 11. The second CB may be, for example, SPS HARQ-ACK CB #1 and SPS HARQ-ACK CB #2 illustrated in FIG. 11.

Control section 203 may add the second CB, following (following in time) the first CB. For example, control section 203 may add SPS HARQ-ACK CB #1 and SPS HARQ-ACK CB #2 following the HARQ-ACK CB illustrated in FIG. 11.

Control section 203 may re-order the response signal of the second CB and a response signal of a third CB included in a third slot, the third codebook being for the response signal in a semi-persistently scheduled signal, the third slot overlapping with the first slot. Control section 203 may add the CB in which the response signals are re-ordered, following the first CB. For example, control section 203 may re-order the SPS HARQ-ACK of SPS HARQ-ACK CB #1 and the SPS HARQ-ACK of SPS HARQ-ACK CB #2 illustrated in FIG. 12. Control section 203 may add the CB for the re-ordered SPS HARQ-ACKs, following the HARQ-ACK CB illustrated in FIG. 12.

Control section 203 may determine a slot set that is a union of a first candidate received signal slot set in which HARQ-ACKs is bundled to the first CB and a second candidate received signal slot set in which HARQ-ACKs is bundled to the second CB. For example, control section 203 may determine a slot set ({#n, #n+1, . . . , #n+5}) that is a union of the candidate PDSCH slot set (slot set of dotted frame A11) in which HARQ-ACKs is bundled to the CB included in st11 illustrated in FIG. 13, the candidate PDSCH slot set (slot set of dotted frame A12) in which HARQ-ACKs is bundled to the CB included in st12, and the candidate PDSCH slot set (slot set of dotted frame A13) in which HARQ-ACKs is bundled to the CB included in st13. Control section 203 may multiplex the CBs of st11, st12, and st13 based on the determined union slot set.

The present disclosure has been described, thus far.

<Hardware Configuration and/or the Like>

Note that, the block diagrams used to describe the embodiment illustrate blocks on the basis of functions. These functional blocks (component sections) are implemented by any combination of at least hardware or software. A method for implementing the functional blocks is not particularly limited. That is, the functional blocks may be implemented using one physically or logically coupled apparatus. Two or more physically or logically separate apparatuses may be directly or indirectly connected (for example, via wires or by radio), and the plurality of apparatuses may be used to implement the functional blocks. The functional blocks may be implemented by combining software with the one apparatus or the plurality of apparatuses described above.

The functions include, but not limited to, judging, deciding, determining, computing, calculating, processing, deriving, investigating, searching, confirming, receiving, transmitting, outputting, accessing, solving, selecting, choosing, establishing, comparing, supposing, expecting, regarding, broadcasting, notifying, communicating, forwarding, configuring, reconfiguring, allocating, mapping, assigning, and the like. For example, a functional block (component section) that functions to achieve transmission is referred to as "transmitting unit," "transmission section," or "transmitter." The methods for implementing the functions are not limited specifically as described above.

Figure 18:
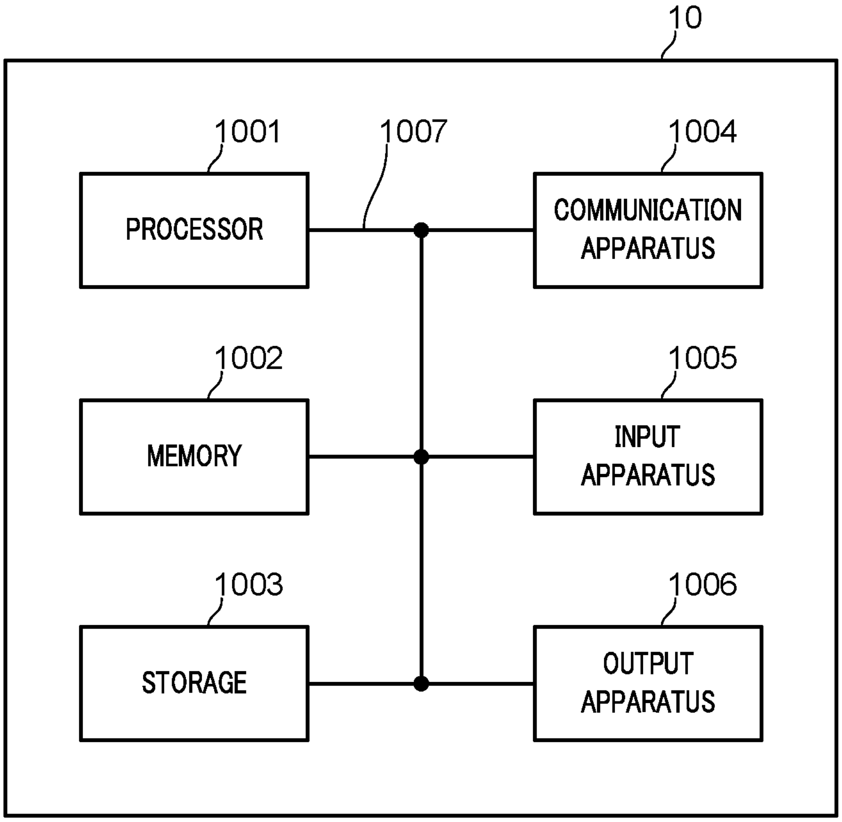
FIG. 18 illustrates an exemplary hardware configuration of the base station and the terminal according to an embodiment of the present disclosure.

For example, the base station, the terminal, and the like according to an embodiment of the present disclosure may function as a computer that executes processing of a wireless communication method of the present disclosure. FIG. 18 illustrates an example of hardware configurations of the base station and the terminal according to an embodiment of the present disclosure. Base station 10 and terminal 20 described above may be each physically constituted as a computer apparatus including processor 1001, memory 1002, storage 1003, communication apparatus 1004, input apparatus 1005, output apparatus 1006, bus 1007, and the like.

Note that, the term "apparatus" in the following description can be replaced with a circuit, a device, a unit, or the like. The hardware configurations of base station 10 and of terminal 20 may include one apparatus or a plurality of apparatuses illustrated in the drawings, or may not include part of the apparatuses.

The functions of base station 10 and terminal 20 are implemented by predetermined software (program) loaded into hardware such as processor 1001, memory 1002, and the like, according to which processor 1001 performs the arithmetic and controls communication performed by communication apparatus 1004 or at least one of reading and writing of data in memory 1002 and storage 1003.

Processor 1001 operates an operating system to entirely control the computer, for example. Processor 1001 may be composed of a central processing unit (CPU) including an interface with peripheral apparatuses, control apparatus, arithmetic apparatus, register, and the like. For example, control section 103 and control section 203 as described above may be implemented by processor 1001.

Processor 1001 reads a program (program code), a software module, data, and the like from at least one of storage 1003 and communication apparatus 1004 to memory 1002 and performs various types of processing according to the program (program code), the software module, the data, and the like. As the program, a program for causing the computer to perform at least a part of the operation described in the above embodiment is used. For example, control section 203 of terminal 20 may be implemented by a control program stored in memory 1002 and operated by a control program operating in processor 1001, and the other functional blocks may also be implemented in the same way. While it has been described that the various types of processing as described above are performed by one processor 1001, the various types of processing may be performed by two or more processors 1001 at the same time or in succession. Processor 1001 may be implemented by one or more chips. Note that, the program may be transmitted from a network through a telecommunication line.

Memory 1002 is a computer-readable recording medium and may be composed of, for example, at least one of a ROM (Read Only Memory), an EPROM (Erasable Programmable ROM), an EEPROM (Electrically Erasable Programmable ROM), and a RAM (Random Access Memory). Memory 1002 may be called a register, a cache, a main memory (main storage apparatus), or the like. Memory 1002 can save a program (program code), a software module, and the like that can be executed to carry out the wireless communication method according to an embodiment of the present disclosure.

Storage 1003 is a computer-readable recording medium and may be composed of, for example, at least one of an optical disk such as a CD-ROM (Compact Disc ROM), a hard disk drive, a flexible disk, a magneto-optical disk (for example, a compact disc, a digital versatile disc, or a Blu-ray (registered trademark) disc), a smart card, a flash memory (for example, a card, a stick, or a key drive), a floppy (registered trademark) disk, and a magnetic strip. Storage 1003 may also be called an auxiliary storage apparatus. The storage medium as described above may be, for example, a database, a server or other appropriate media including at least one of memory 1002 and storage 1003.

Communication apparatus 1004 is hardware (transmission and reception device) for communication between computers through at least one of wired and wireless networks and is also called, for example, a network device, a network controller, a network card, or a communication module. Communication apparatus 1004 may be configured to include a high frequency switch, a duplexer, a filter, a frequency synthesizer, and the like in order to achieve at least one of Frequency Division Duplex (FDD) and Time Division Duplex (TDD), for example. For example, transmission section 101, reception section 102, reception section 201, and transmission section 202, and the like as described above may be realized by communication apparatus 1004.

Input apparatus 1005 is an input device (for example, a keyboard, a mouse, a microphone, a switch, a button, or a sensor) that receives input from the outside. Output apparatus 1006 is an output device (for example, a display, a speaker, or an LED lamp) which makes outputs to the outside. Note that, input apparatus 1005 and output apparatus 1006 may be integrated (for example, a touch panel).

The apparatuses, such as processor 1001, memory 1002 and the like, are connected by bus 1007 for communication of information. Bus 1007 may be configured using one bus or using buses different between each pair of the apparatuses.

Furthermore, base station 10 and terminal 20 may include hardware, such as a microprocessor, a digital signal processor (DSP), an ASIC (Application Specific Integrated Circuit), a PLD (Programmable Logic Device), and an FPGA (Field Programmable Gate Array), and the hardware may implement part or all of the functional blocks. For example, processor 1001 may be implemented using at least one of these pieces of hardware.

<Notification and Signaling of Information>

The notification of information is not limited to the embodiment described in the present disclosure, and the information may be notified by another method. For example, the notification of information may be carried out by one or a combination of physical layer signaling (for example, Downlink Control Information (DCI) and Uplink Control Information (UCI)), higher layer signaling (for example, Radio Resource Control (RRC) signaling, Medium Access Control (MAC) signaling, broadcast information (Master Information Block (MIB), and System Information Block (SIB))), and other signals or a combination thereof. The RRC signaling may be called an RRC message and may be, for example, an RRC connection setup message, an RRC connection reconfiguration message, or the like.

<Applied System>

The embodiment described in the present specification may be applied to at least one of systems using Long Term Evolution (LTE), LTE-Advanced (LTE-A), SUPER 3G, IMT-Advanced, the 4th generation mobile communication system (4G), the 5th generation mobile communication system (5G), Future Radio Access (FRA), New Radio (NR), W-CDMA (registered trademark), GSM (registered trademark), CDMA2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), or other appropriate systems and a next-generation system extended based on the above systems. Additionally or alternatively, a combination of two or more of the systems (e.g., a combination of at least LTE or LTE-A and 5G) may be applied.

<Processing Procedure and/or the Like>

The orders of the processing procedures, the sequences, the flowcharts, and the like of the aspect/embodiment described in the present disclosure may be changed as long as there is no contradiction. For example, elements of various steps are presented in exemplary orders in the methods described in the present disclosure, and the methods are not limited to the presented specific orders.

<Operation of Base Station>

Specific operations which are described in the present disclosure as being performed by the base station may sometimes be performed by an upper node depending on the situation. Various operations performed for communication with a terminal in a network constituted by one network node or a plurality of network nodes including a base station can be obviously performed by at least one of the base station and a network node other than the base station (examples include, but not limited to, Mobility Management Entity (MME) or Serving Gateway (S-GW)). Although there is one network node in addition to the base station in the case illustrated above, a plurality of other network nodes may be combined (for example, MME and S-GW).

<Direction of Input and Output>

The information or the like (see the item of <Information and Signals>) can be output from a higher layer (or lower layer) to a lower layer (or higher layer). The information and the like may be input and output through a plurality of network nodes.

<Handling of Input and Output Information and the Like>

The input and output information and the like may be saved in a specific place (for example, memory) or may be managed using a management table. The input and output information and the like can be overwritten, updated, or additionally written. The output information and the like may be deleted. The input information and the like may be transmitted to another apparatus.

<Determination Method>

The determination may be made based on a value expressed by one bit (0 or 1), based on a Boolean value (true or false), or based on comparison with a numerical value (for example, comparison with a predetermined value).

Variations and the Like of Aspects

The aspects/embodiment described in the present disclosure may be independently used, may be used in combination, or may be switched and used along the execution. Furthermore, notification of predetermined information (for example, notification indicating "it is X") is not limited to explicit notification, and may be performed implicitly (for example, by not notifying the predetermined information).

While the present disclosure has been described in detail, it is obvious to those skilled in the art that the present disclosure is not limited to the embodiment described in the present disclosure. Modifications and variations of the aspect of the present disclosure can be made without departing from the spirit and the scope of the present disclosure defined by the description of the appended claims. Therefore, the description of the present disclosure is intended for exemplary description and does not limit the present disclosure in any sense.

<Software>

Regardless of whether the software is called as software, firmware, middleware, a microcode, or a hardware description language or by another name, the software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, and the like.

The software, the instruction, the information, and the like may be transmitted and received through a transmission medium. For example, when the software is transmitted from a website, a server, or another remote source by using at least one of a wired technique (e.g., coaxial cable, optical fiber cable, twisted pair, and digital subscriber line (DSL)) and a radio technique (e.g., infrared ray and microwave), the at least one of the wired technique and the radio technique is included in the definition of the transmission medium.

<Information and Signals>

The information, the signals, and the like described in the present disclosure may be expressed by using any of various different techniques. For example, data, instructions, commands, information, signals, bits, symbols, chips, and the like that may be mentioned throughout the entire description may be expressed by one or a random combination of voltage, current, electromagnetic waves, magnetic fields, magnetic particles, optical fields, and photons.

Note that the terms described in the present disclosure and the terms necessary to understand the present disclosure may be replaced with terms with the same or similar meaning. For example, at least one of the channel and the symbol may be a signal (signaling). The signal may be a message. The component carrier (CC) may be called a carrier frequency, a cell, a frequency carrier, or the like.

<System and Network>

The terms "system" and "network" used in the present disclosure can be interchangeably used.

<Names of Parameters and Channels>

The information, the parameters, and the like described in the present disclosure may be expressed using absolute values, using values relative to predetermined values, or using other corresponding information. For example, radio resources may be indicated by indices.

The names used for the parameters are not limitative in any respect. Furthermore, the numerical formulae and the like using the parameters may be different from the ones explicitly disclosed in the present disclosure. Various channels (for example, PUCCH and PDCCH) and information elements, can be identified by any suitable names, and various names assigned to these various channels and information elements are not limitative in any respect.

<Base Station>

The terms "Base Station (BS)," "radio base station," "fixed station," "NodeB," "eNodeB (eNB)," "gNodeB (gNB)," "access point," "transmission point," "reception point," "transmission/reception point," "cell," "sector," "cell group," "carrier," and "component carrier" may be used interchangeably in the present disclosure. The base station may be called a macro cell, a small cell, a femtocell, or a pico cell.

The base station can accommodate one cell or a plurality of (for example, three) cells. When the base station accommodates a plurality of cells, the entire coverage area of the base station can be divided into a plurality of smaller areas, and each of the smaller areas can provide a communication service based on a base station subsystem (for example, small base station for indoor remote radio head (RRH)). The term "cell" or "sector" denotes part or all of the coverage area of at least one of the base station and the base station subsystem that perform the communication service in the coverage.

<Mobile Sation>

The terms "Mobile Station (MS)," "user terminal," "User Equipment (UE)," and "terminal" may be used interchangeably in the present disclosure.

The mobile station may be called, by those skilled in the art, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user agent, a mobile client, a client, or by some other appropriate terms.

<Base Station/Mobile Station>

At least one of the base station and the mobile station may be called a transmission apparatus, a reception apparatus, a communication apparatus, or the like. Note that, at least one of the base station and the mobile station may be a device mounted in a mobile entity, the mobile entity itself, or the like. The mobile entity may be a means of transport (e.g., automobile, airplane, or the like), an unmanned mobile entity (e.g., drone, autonomous driving vehicle, or the like), or a robot (manned or unmanned). Note that, at least one of the base station and the mobile station also includes an apparatus that does not necessarily move during communication operation. For example, at least one of the base station and the mobile station may be Internet-of-Things (IoT) equipment such as a sensor.

The base station in the present disclosure may also be replaced with the terminal. For example, the embodiment of the present disclosure may find application in a configuration that results from replacing communication between the base station and the terminal with communication between multiple terminals (such communication may, for example, be referred to as device-to-device (D2D), vehicle-to-everything (V2X), or the like). In this case, terminal 20 may be configured to have the functions that base station 10 described above has. The wordings "uplink" and "downlink" may be replaced with a corresponding wording for inter-terminal communication (for example, "side"). For example, an uplink channel, a downlink channel, and the like may be replaced with a side channel.

Similarly, the terminal in the present disclosure may be replaced with the base station. In this case, base station 10 is configured to have the functions that terminal 20 described above has.

Meaning and Interpretation of Terms

As used herein, the term "determining" may encompass a wide variety of actions. For example, "determining" may be regarded as judging, calculating, computing, processing, deriving, investigating, looking up (search or inquiry) (e.g., looking up in table, database or another data structure), ascertaining and the like. Furthermore, "determining" may be regarded as receiving (for example, receiving information), transmitting (for example, transmitting information), inputting, outputting, accessing (for example, accessing data in memory) and the like. Further, "determining" may be regarded as resolving, selecting, choosing, establishing, comparing and the like. That is, "determining" may be regarded as a certain type of action related to determining. Further, "determining" may be replaced with "assuming," "expecting," "considering," and the like.

The terms "connected" and "coupled" as well as any modifications of the terms mean any direct or indirect connection and coupling between two or more elements, and the terms can include cases in which one or more intermediate elements exist between two "connected" or "coupled" elements. The coupling or the connection between elements may be physical or logical coupling or connection or may be a combination of physical and logical coupling or connection. For example, "connected" may be replaced with "accessed." When the terms are used in the present disclosure, two elements can be considered to be "connected" or "coupled" to each other using at least one of one or more electrical wires, cables, and printed electrical connections or using electromagnetic energy with a wavelength of a radio frequency domain, a microwave domain, an optical (both visible and invisible) domain, or the like that are non-limiting and non-inclusive examples.

<Reference Signal>

The reference signal can also be abbreviated as an RS and may also be called as a pilot depending on the applied standard.

<Meaning of "Based On">

The description "based on" used in the present disclosure does not mean "based only on," unless otherwise specified. In other words, the description "based on" means both of "based only on" and "based at least on."

<Terms "First" and "Second">

Any reference to elements by using the terms "first," "second," and the like that are used in the present disclosure does not generally limit the quantities of or the order of these elements. The terms can be used as a convenient method of distinguishing between two or more elements in the present disclosure. Therefore, reference to first and second elements does not mean that only two elements can be employed, or that the first element has to precede the second element somehow.

<"Means">

The "means" in the configuration of each apparatus described above may be replaced with "section," "circuit," "device," or the like.

<Open-Ended Format>

In a case where terms "include," "including," and their modifications are used in the present disclosure, these terms are intended to be inclusive like the term "comprising." Further, the term "or" used in the present disclosure is not intended to be an exclusive or.

<Time Units Such as a TTI, Frequency Units Such as an RB, and a Radio Frame Configuration>

The radio frame may be constituted by one frame or a plurality of frames in the time domain. The one frame or each of the plurality of frames may be called a subframe in the time domain. The subframe may be further constituted by one slot or a plurality of slots in the time domain. The subframe may have a fixed time length (e.g., 1 ms) independent of numerology.

The numerology may be a communication parameter that is applied to at least one of transmission and reception of a certain signal or channel. The numerology, for example, indicates at least one of SubCarrier Spacing (SCS), a bandwidth, a symbol length, a cyclic prefix length, Transmission Time Interval (TTI), the number of symbols per TTI, a radio frame configuration, specific filtering processing that is performed by a transmission and reception apparatus in the frequency domain, specific windowing processing that is performed by the transmission and reception apparatus in the time domain, and the like.

The slot may be constituted by one symbol or a plurality of symbols (e.g., Orthogonal Frequency Division Multiplexing (OFDM)) symbol, Single Carrier-Frequency Division Multiple Access (SC-FDMA) symbol, or the like) in the time domain. The slot may also be a time unit based on the numerology.

The slot may include a plurality of mini-slots. Each of the mini-slots may be constituted by one or more symbols in the time domain. Furthermore, the mini-slot may be referred to as a subslot. The mini-slot may be constituted by a smaller number of symbols than that of the slot. PDSCH (or PUSCH) that is transmitted in the time unit that is greater than the mini-slot may be referred to as PDSCH (or PUSCH) mapping type A. PDSCH (or PUSCH) that is transmitted using the mini-slot may be referred to as PDSCH (or PUSCH) mapping type B.

The radio frame, the subframe, the slot, the mini slot, and the symbol indicate time units in transmitting signals. The radio frame, the subframe, the slot, the mini slot, and the symbol may be called by other corresponding names.

For example, one subframe, a plurality of continuous subframes, one slot, or one mini-slot may be called a Transmission Time Interval (TTI). That is, at least one of the subframe and the TTI may be a subframe (1 ms) in the existing LTE, a duration (for example, 1 to 13 symbols) that is shorter than 1 ms, or a duration that is longer than 1 ms. Note that, a unit that represents the TTI may be referred to as a slot, a mini-slot, or the like instead of a subframe.

Here, the TTI, for example, refers to a minimum time unit for scheduling in radio communication. For example, in an LTE system, the base station performs scheduling for allocating a radio resource (frequency bandwidth, transmit power, and the like that are used in each user terminal) on a TTI-by-TTI basis to each user terminal. Note that the definition of TTI is not limited to this.

The TTI may be a time unit for transmitting a channel-coded data packet (transport block), a code block, or a codeword, or may be a unit for processing such as scheduling and link adaptation. Note that, when the TTI is assigned, a time section (for example, the number of symbols) to which the transport block, the code block, the codeword, or the like is actually mapped may be shorter than the TTI.

Note that, in a case where one slot or one mini-slot is referred to as the TTI, one or more TTIs (that is, one or more slots, or one or more mini-slots) may be a minimum time unit for the scheduling. Furthermore, the number of slots (the number of mini-slots) that makes up the minimum time unit for the scheduling may be controlled.

A TTI that has a time length of 1 ms may be referred to as a usual TTI (TTI in LTE Rel. 8 to LTE Rel. 12), a normal TTI, a long TTI, a usual subframe, a normal subframe, a long subframe, a slot, or the like. A TTI that is shorter than the usual TTI may be referred to as a shortened TTI, a short TTI, a partial TTI (or fractional TTI), a shortened subframe, a short subframe, a mini-slot, a subslot, a slot, or the like.

Note that the long TTI (for example, usual TTI, subframe, or the like) may be replaced with the TTI that has a time length which exceeds 1 ms, and the short TTI (for example, shortened TTI or the like) may be replaced with a TTI that has a TTI length which is less than a TTI length of the long TTI and is equal to or longer than 1 ms.

A resource block (RB) is a resource-allocation unit in the time domain and the frequency domain, and may include one or more contiguous subcarriers in the frequency domain. The number of subcarriers that is included in the RB may be identical regardless of the numerology, and may be 12, for example. The number of subcarriers that is included in the RB may be determined based on the numerology.

In addition, the RB may include one symbol or a plurality of symbols in the time domain, and may have a length of one slot, one mini slot, one subframe, or one TTI. One TTI, one subframe, and the like may be each constituted by one resource block or a plurality of resource blocks.

Note that one or more RBs may be referred to as a Physical Resource Block (PRB), a Sub-Carrier Group (SCG), a Resource Element Group (REG), a PRB pair, an RB pair, or the like.

In addition, the resource block may be constituted by one or more Resource Elements (REs). For example, one RE may be a radio resource region that is one subcarrier and one symbol.

A bandwidth part (BWP) (which may be referred to as partial bandwidth or the like) may represent a subset of contiguous common resource blocks (RB) for certain numerology in a certain carrier. Here, the common RBs may be identified by RB indices with reference to a common reference point of the carrier. The PRB may be defined by a certain BWP and may be numbered within the BWP.

The BWP may include a UL BWP and a DL BWP. An UE may be configured with one or more BWPs within one carrier.

At least one of the configured BWPs may be active, and the UE does not have to assume transmission/reception of a predetermined signal or channel outside the active BWP. Note that, "cell," "carrier," and the like in the present disclosure may be replaced with "BWP."

Structures of the radio frame, the subframe, the slot, the mini-slot, the symbol, and the like are described merely as examples. For example, the configuration such as the number of subframes that is included in the radio frame, the number of slots per subframe or radio frame, the number of mini-slots that is included within the slot, the numbers of symbols and RBs that are included in the slot or the mini-slot, the number of subcarriers that is included in the RB, the number of symbols within the TTI, the symbol length, the Cyclic Prefix (CP) length, and the like can be changed in various ways.

<Maximum Transmit Power>

The "maximum transmit power" described in the present disclosure may mean a maximum value of the transmit power, the nominal UE maximum transmit power, or the rated UE maximum transmit power.

<Articles>

In a case where articles, such as "a," "an," and "the" in English, for example, are added in the present disclosure by translation, nouns following these articles may have the same meaning as used in the plural.

<"Different"

In the present disclosure, the expression "A and B are different" may mean that "A and B are different from each other." Note that, the expression may also mean that "A and B are different from C." The expressions "separated" and "coupled" may also be interpreted in the same manner as the expression "A and B are different."

INDUSTRIAL APPLICABILITY

An aspect of the present disclosure is useful for communication systems.

REFERENCE SIGNS LIST

10 Base station
20 Terminal
101, 202 Transmission section
102, 201 Reception section
103, 203 Control section

The invention claimed is:

1. A terminal, comprising:

a control section that multiplexes, with each other, a first codebook included in a first slot and a second codebook included in a second slot, the first codebook being for a response signal in a dynamically-scheduled signal, the second codebook being for a response signal in a semi-persistently-scheduled signal, the second slot being a slot that is on an uplink cell different from that of the first slot and that overlaps with the first slot, wherein the control section is configured to multiplex the first codebook and the second codebook with each other based on a slot set that is a union of a first candidate received signal slot set in which a plurality of the response signals is bundled to the first code book and a second candidate received signal slot set in which a plurality of the response signals is bundled to the second code book; and a transmission section that transmits the multiplexed first codebook and the second codebook.

2. The terminal according to claim 1, wherein the control section adds the second codebook, following the first codebook.

3. The terminal according to claim 1, wherein the control section re-orders the response signal of the second codebook and a response signal of a third codebook included in a third slot, the third codebook being for the response signal in a semi-persistently scheduled signal, the third slot overlapping with the first slot, and adds a codebook in which the response signals are re-ordered, following the codebook included in the first slot.

4. A radio communication method, comprising:

multiplexing, with each other, a first codebook included in a first slot and a second codebook included in a second slot, the first codebook being for a response signal in a dynamically-scheduled signal, the second codebook being for a response signal in a semi-persistently-scheduled signal, the second slot being a slot that is on an uplink cell different from that of the first slot and that overlaps with the first slot, wherein the multiplexing of the first codebook and the second codebook is based on a slot set that is a union of a first candidate received signal slot set in which a plurality of the response signals is bundled to the first code book and a second candidate received signal slot set in which a plurality of the response signals is bundled to the second code book; and transmitting the multiplexed first codebook and the second codebook.

* * * * *